(12) United States Patent
Lee et al.

(10) Patent No.: US 7,755,734 B2
(45) Date of Patent: Jul. 13, 2010

(54) LIQUID CRYSTAL DISPLAY AND THIN FILM TRANSISTOR ARRAY PANEL THEREFOR

(75) Inventors: Jeong-Ho Lee, Seoul (KR); Yeon-Sik Ham, Seoul (KR); Kye-Hun Lee, Suwon-si (KR); Jang-Kun Song, Seoul (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 449 days.

(21) Appl. No.: 10/813,304

(22) Filed: Mar. 31, 2004

(65) Prior Publication Data

US 2004/0257488 A1    Dec. 23, 2004

(30) Foreign Application Priority Data

Mar. 31, 2003  (KR) .................. 10-2003-0020087
Jun. 13, 2003   (KR) .................. 10-2003-0038220

(51) Int. Cl.
*G02F 1/1343* (2006.01)
*G02F 1/136* (2006.01)
*G02F 1/1337* (2006.01)

(52) U.S. Cl. .................. 349/139; 349/42; 349/129
(58) Field of Classification Search .......... 349/42–43, 349/129, 139
See application file for complete search history.

(56) References Cited

U.S. PATENT DOCUMENTS

| | | | | |
|---|---|---|---|---|
| 6,038,006 A * | 3/2000 | Sasaki et al. | ................. | 349/106 |
| 6,573,965 B1 * | 6/2003 | Liu et al. | ..................... | 349/129 |
| 6,639,640 B1 * | 10/2003 | Matsuoka et al. | ........... | 349/139 |
| 6,671,020 B2 * | 12/2003 | Kim et al. | .................... | 349/129 |
| 6,897,918 B1 * | 5/2005 | Nonaka et al. | .............. | 349/106 |
| 7,224,421 B1 * | 5/2007 | Takeda et al. | ............... | 349/129 |
| 2002/0163604 A1* | 11/2002 | Kim et al. | ...................... | 349/43 |

FOREIGN PATENT DOCUMENTS

| | | |
|---|---|---|
| KR | 1999-006951 | 1/1999 |
| KR | 10-2000-0060600 A | 10/2000 |
| KR | 10-2001-0059954 A | 7/2001 |
| KR | 10-2002-0007899 A | 1/2002 |
| KR | 1020020010211 A | 2/2002 |
| KR | 1020020088218 A | 11/2002 |

* cited by examiner

*Primary Examiner*—Dung T. Nguyen
(74) *Attorney, Agent, or Firm*—Innovation Counsel LLP

(57) ABSTRACT

A gate line extending in a transverse direction and a data line intersecting the gate line are formed on the substrate. A pixel electrode connected to the gate line and the data line through a thin film transistor is formed on an insulating layer. The pixel electrode has a cutout and a protrusion is disposed in the cutout. Another protrusion is disposed on the data line.

13 Claims, 31 Drawing Sheets

LIQUID CRYSTAL DISPLAY AND THIN FILM TRANSISTOR ARRAY PANEL THEREFOR

BACKGROUND OF THE INVENTION

1. Field of the Invention

The present invention relates to a liquid crystal display and a thin film transistor array panel therefor.

2. Description of the Related Art

A liquid crystal display (LCD) is one of the most widely used flat panel displays. LCDs are used in notebook or laptop computers, desktop computer monitors and televisions. LCDs are lightweight and occupy less space than conventional cathode ray tube (CRT) displays.

The general structure of an LCD consists of a liquid crystal (LC) layer that is positioned between pair of panels including field generating electrodes and polarizers. The LC layer is subject to an electric field generated by the electrodes and variations in the field strength change the molecular orientation of the LC layer. For example, upon application of an electric field, the molecules of the LC layer change their orientation and polarize light passing through the LC layer. Appropriately positioned polarized filters block the polarized light, creating dark areas that can represent desired images.

One measure of LCD quality is viewing angle (i.e., the available area when viewing the LCD in which minimum contrast can be seen). Various techniques for enlarging the viewing angle have been suggested, including a technique utilizing a vertically aligned LC layer and providing cutouts or protrusions at field generating electrodes. However, cutouts and the protrusions reduce the aperture ratio to decrease the luminance of the LCD. To increase aperture ratio, it has been suggested that the size of the pixel electrodes be maximized. However, maximization of the size of the pixel electrodes results in a close distance between the pixel electrodes, causing strong lateral electric fields between the pixel electrodes. The strong electric fields cause unwanted altering of the orientation of the LC molecules, yielding textures and light leakage and deteriorating display characteristics.

SUMMARY OF THE INVENTION

A thin film transistor array panel is provided, which includes: a substrate; a gate line formed on the substrate and including a gate electrode; a gate insulating layer formed on the gate line; a semiconductor layer formed on the gate insulating layer; a data line formed at least in part on the semiconductor layer; a drain electrode formed on the semiconductor layer at least in part and separated from the data line; a first passivation layer formed on the data line and the drain electrode; a first protrusion formed on the first passivation layer and disposed opposite the data line; and a pixel electrode formed on the first passivation layer and connected to the drain electrode.

The pixel electrode may have a cutout and the thin film transistor array panel may further include a second protrusion disposed in the cutout.

The thin film transistor array panel may further include a storage electrode line overlapping the pixel electrode, and the storage electrode line may include an expansion overlapping the drain electrode. The storage electrode line may include a branch overlapping the cutout.

The first protrusion may be wider than the data line, and the data line may be curved.

The thin film transistor array panel may further include a spacer having a height larger than the first protrusion and disposed on the same layer as the first protrusion. The first protrusion and the spacer may include organic material.

The thin film transistor array panel may further include a color filter disposed between the first passivation layer and the first protrusion and the pixel electrode, and it may also include a second passivation layer formed on the color filter and the first protrusion and the pixel electrode.

The semiconductor layer may have substantially the same planar shape as the data line and the drain electrode.

A thin film transistor array panel is provided, which includes: a substrate; a gate line formed on the substrate and including a gate electrode; a gate insulating layer formed on the gate line; a semiconductor layer formed on the gate insulating layer; a data line formed at least in part on the semiconductor layer; a drain electrode formed on the semiconductor layer at least in part and separated from the data line; a first passivation layer formed on the data line and the drain electrode and having a contact hole exposing the drain electrode at least in part; a pixel electrode formed on the first passivation layer and connected to the drain electrode through the contact hole; and a protrusion formed on the first passivation layer and disposed in the cutout at least in part.

The thin film transistor array panel may further include a storage electrode line overlapping the pixel electrode, and the storage electrode line may include an expansion overlapping the drain electrode. The storage electrode line may include a branch overlapping the cutout.

The data line may be curved.

The thin film transistor array panel may further include a spacer having a height larger than the protrusion and disposed on the same layer as the protrusion. The first protrusion and the spacer may include organic material.

The thin film transistor array panel may further include a color filter disposed between the first passivation layer and the protrusion and the pixel electrode, and it may also include a second passivation layer formed on the color filter and the protrusion and the pixel electrode.

The thin film transistor array panel may farther include a color filter disposed between the first passivation layer and the protrusion and the pixel electrode, and it may also include a second passivation layer formed on the color filter and the protrusion and the pixel electrode.

The semiconductor layer may have substantially the same planar shape as the data line and the drain electrode.

A liquid crystal display is provided, which includes: a first substrate; a gate line formed on the first substrate; a data line intersecting the gate line; a thin film transistor connected to the gate line and the data line; a pixel electrode connected to the thin film transistor and having a first cutout; a second substrate facing the first substrate; a common electrode formed on the second substrate and having a second cutout; and a first protrusion disposed in at least one of the first and the second cutouts at least in part.

The liquid crystal display may further includes: a light blocking member disposed on one of the first and the second substrates; and a color filter disposed on one of the first and the second substrates.

The liquid crystal display may further include a second protrusion disposed on the data line.

The first cutout does not overlap the second cutout.

BRIEF DESCRIPTION OF THE DRAWINGS

The present invention will become more apparent by describing preferred embodiments thereof in detail with reference to the accompanying drawings in which.

DETAILED DESCRIPTION OF PREFERRED EMBODIMENTS

Figure 1:
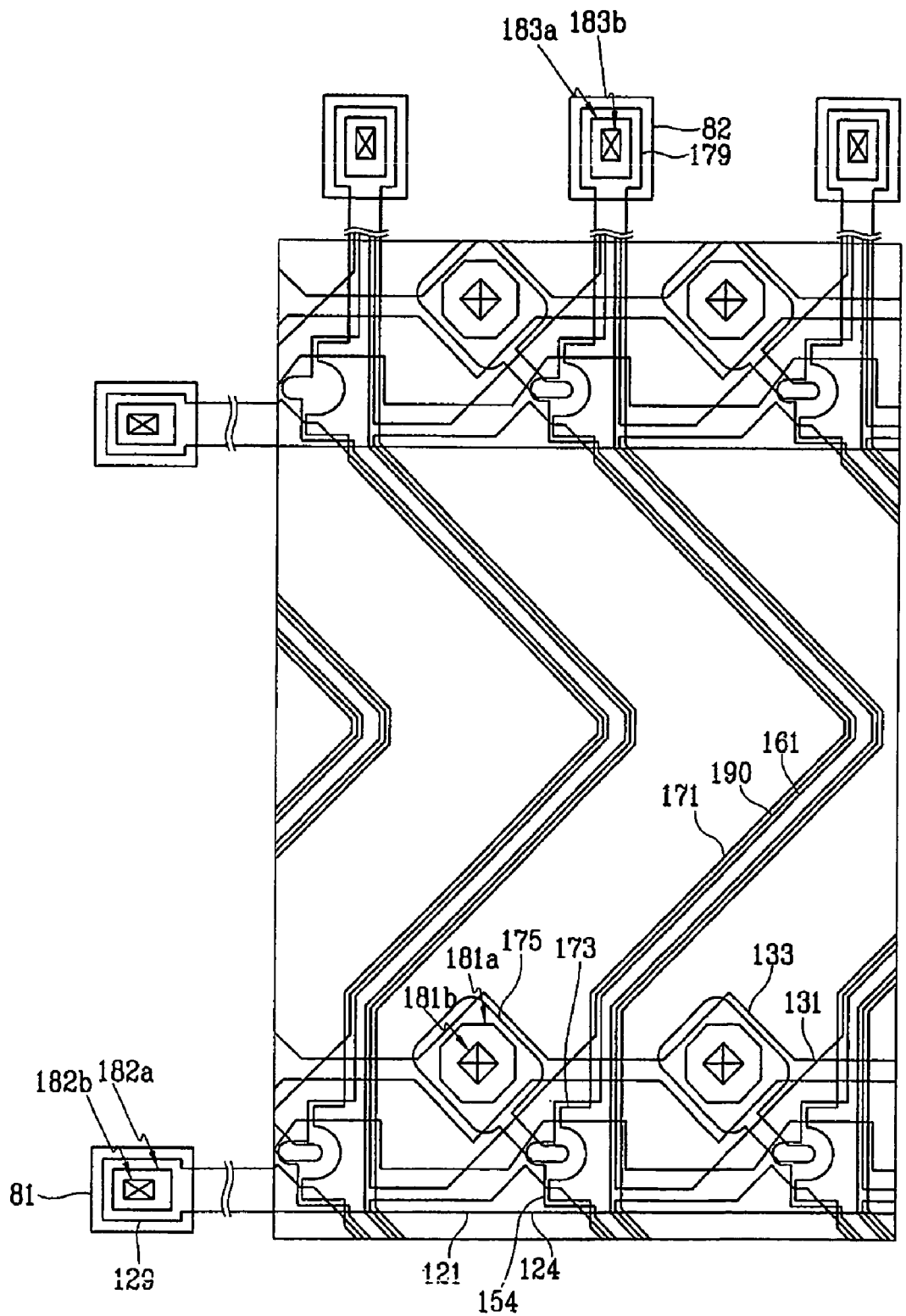
FIG. 1 is a layout view of a TFT array panel for an LCD according to an embodiment of the present invention.

The present invention now will be described more fully hereinafter with reference to the accompanying drawings, in which preferred embodiments of the invention are shown. The present invention may, however, be embodied in many different forms and should not be construed as limited to the embodiments set forth herein.

In the drawings, the thickness of layers, films and regions are exaggerated for clarity. Like numerals refer to like elements throughout. It will be understood that when an element such as a layer, film, region or substrate is referred to as being "on" another element, it can be directly on the other element or intervening elements may also be present. In contrast, when an element is referred to as being "directly on" another element, there are no intervening elements present.

Now, liquid crystal displays and thin film transistor (TFT) array panels for LCDs according to embodiments of the present invention will be described with reference to the accompanying drawings.

Figure 2:
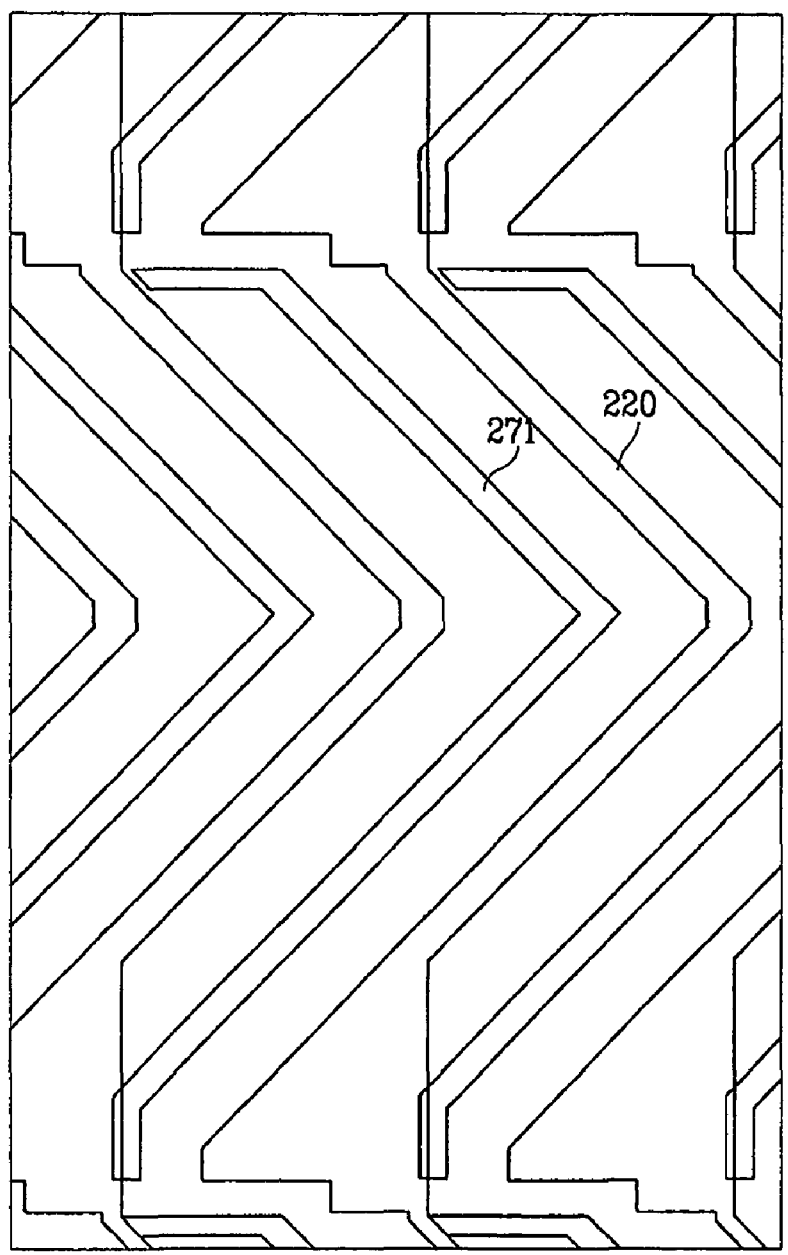
FIG. 2 is a layout view of a common electrode panel for an LCD according to an embodiment of the present invention.
Figure 3:
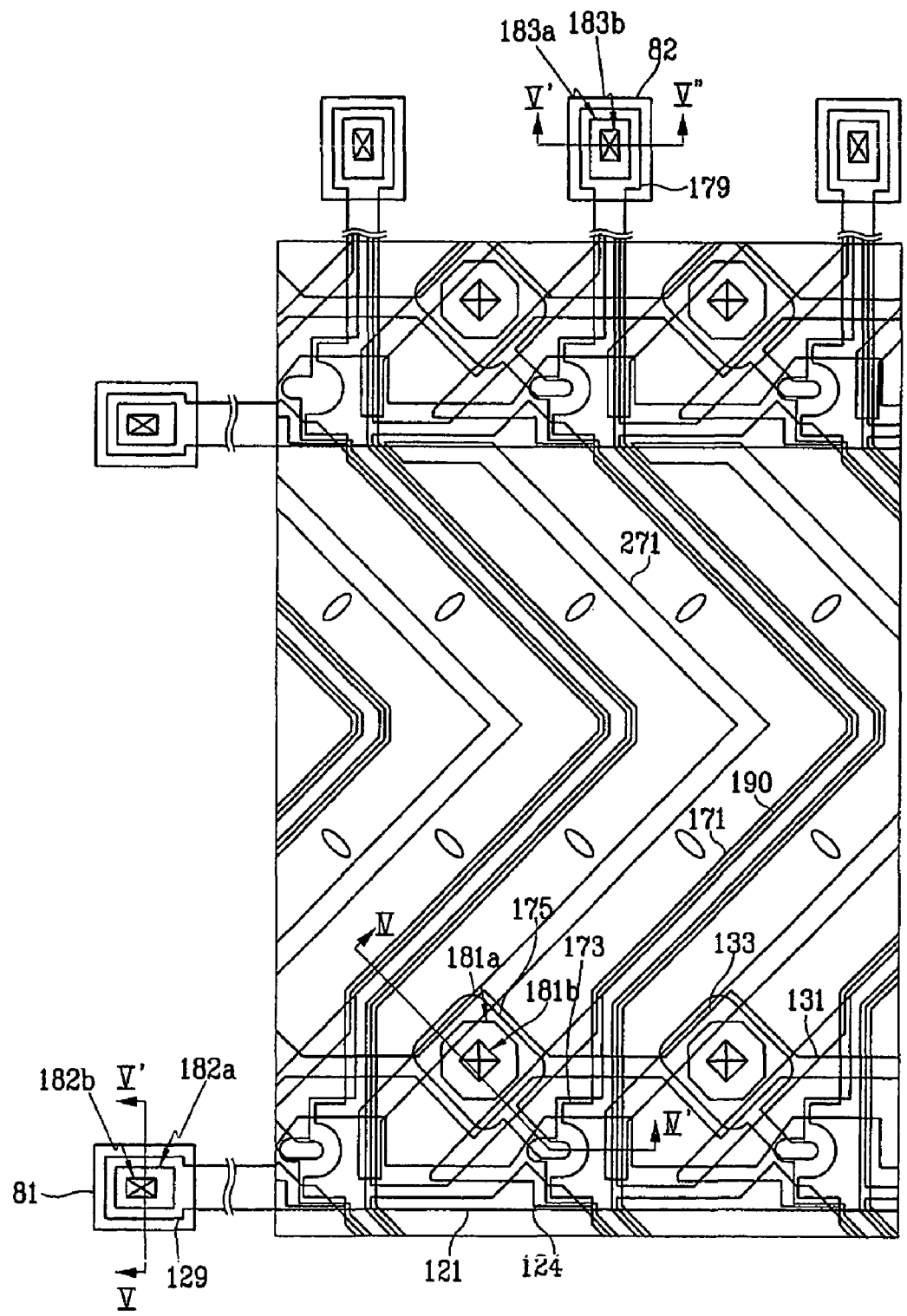
FIG. 3 is a layout view of an LCD including the TFT array panel shown in FIG. 1 and the common electrode panel shown in FIG. 2.
Figure 4:
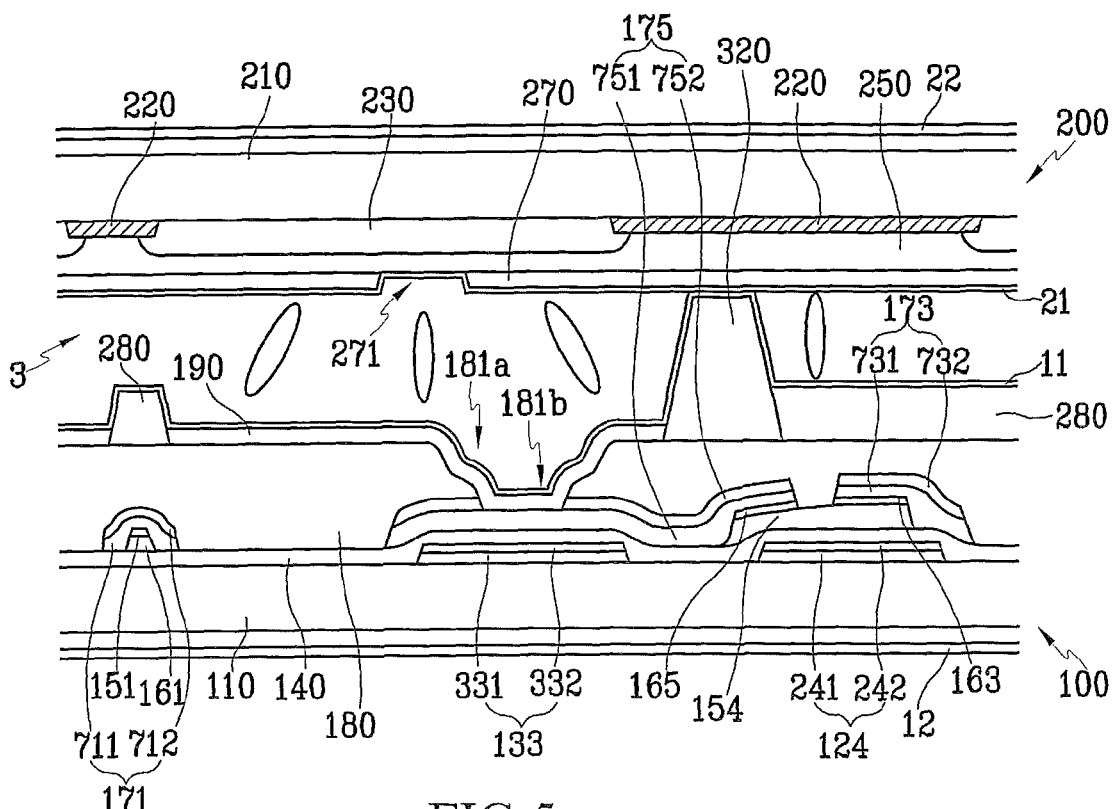
FIG. 4 is a sectional view of the LCD shown in FIG. 3 taken along the line IV-IV'.
Figure 5:
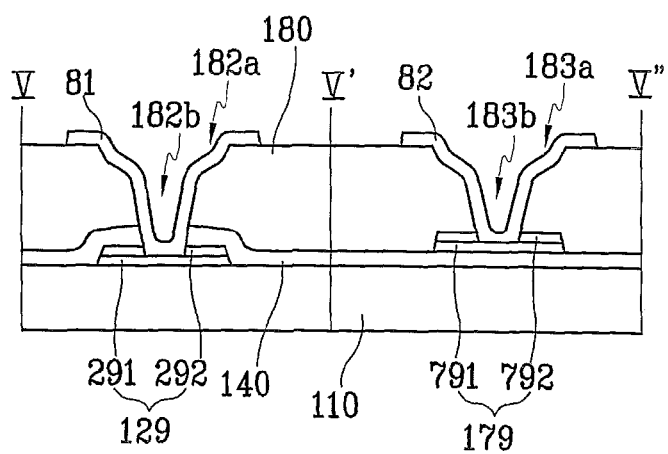
FIG. 5 is a sectional view of the LCD shown in FIG. 3 taken along the lines V-V' and V'-V"

FIG. 1 is a layout view of a TFT array panel for an LCD according to an embodiment of the present invention, FIG. 2 is a layout view of a common electrode panel for an LCD according to an embodiment of the present invention, FIG. 3 is a layout view of an LCD including the TFT array panel shown in FIG. 1 and the common electrode panel shown in FIG. 2, FIG. 4 is a sectional view of the LCD shown in FIG. 3 taken along the line IV-IV', and FIG. 5 is a sectional view of the LCD shown in FIG. 3 taken along the lines V-V' and V'-V".

An LCD according to an embodiment of the present invention includes a TFT array panel 100, a common electrode panel 200 facing the TFT array panel 100, and a LC layer 3 interposed between the TFT array panel 100 and the common electrode panel 200.

The TFT array panel 100 is now described in detail with reference to FIGS. 1, 4 and 5.

A plurality of gate lines 121 and a plurality of storage electrode lines 131 are formed on an insulating substrate 110.

The gate lines 121 extend substantially in a transverse direction and are separated from each other and transmit gate signals. Each gate line 121 includes a plurality of projections forming a plurality of gate electrodes 124 and an end portion 129 having a large area for contact with another layer or an external device.

Each storage electrode line 131 extends substantially in the transverse direction and includes a plurality of projections forming storage electrodes 133. Each storage electrode 133 has a shape of a diamond or a rectangle rotated by about 45 degrees and they are located close to the gate lines 121. The storage electrode lines 131 are supplied with a predetermined voltage such as a common voltage, which is applied to a common electrode 270 on the common electrode panel 200 of the LCD.

The gate lines 121 and the storage electrode lines 131 have a multi-layered structure including two films having different physical characteristics, a lower film and an upper film. The upper film is preferably made of low resistivity metal including Al containing metal such as Al and Al alloy, Ag containing metal such as Ag and Ag alloy, or Cu containing metal such as Cu and Cu alloy for reducing signal delay or voltage drop in the gate lines 121 and the storage electrode lines 131. On the other hand, the lower film is preferably made of material such as Cr, Mo, Mo alloy, Ta, or Ti, which has good physical, chemical, and electrical contact characteristics with other materials such as indium tin oxide (ITO) or indium zinc oxide (IZO). A good exemplary combination of the lower film material and the upper film material is Cr and Al—Nd alloy. In FIGS. 4, the lower and the upper films of the gate electrodes 124 are indicated by reference numerals 241 and 242, respectively, the lower and the upper films of the end portions 129 are indicated by reference numerals 291 and 292, respectively, and the lower and the upper films of the storage electrodes 133 are indicated by reference numerals 331 and 332, respectively. Portions of the upper film 292 of the end portions 129 of the gate lines 121 are removed to expose the underlying portions of the lower films 291.

The gate lines 121 and the storage electrode lines 131 may have a single layer structure or may include three or more layers.

In addition, the lateral sides of the gate lines 121 and the storage electrode lines 131 are inclined relative to a surface of the substrate 110, and the inclination angle thereof ranges about 30-80 degrees.

A gate insulating layer 140 preferably made of silicon nitride (SiNx) is formed on the gate lines 121 and the storage electrode lines 131.

A plurality of semiconductor stripes 151 preferably made of hydrogenated amorphous silicon (abbreviated as "a-Si") or polysilicon are formed on the gate insulating layer 140. Each semiconductor stripe 151 extends substantially in the longitudinal direction while it is curved periodically. Each semiconductor stripe 151 has a plurality of projections 154 branched out toward the gate electrodes 124. Each semiconductor island 150 is located opposite the gate electrodes 124.

A plurality of ohmic contact stripes and islands 161 and 165 preferably made of silicide or n+ hydrogenated a-Si heavily doped with n type impurity are formed on the semiconductor stripes 151. Each ohmic contact stripe 161 has a plurality of projections 163, and the projections 163 and the ohmic contact islands 165 are located in pairs on the projections 154 of the semiconductor stripes 151.

The lateral sides of the semiconductor stripes 151 and the ohmic contacts 161 and 165 are inclined relative to a surface of the substrate 110, and the inclination angles thereof are is preferably in a range between about 30-80 degrees.

A plurality of data lines 171 and a plurality of drain electrodes 175 separated from each other are formed on the ohmic contacts 161 and 165 and the gate insulating layer 140.

The data lines 171 for transmitting data voltages extend substantially in the longitudinal direction and intersect the gate lines 121 and the storage electrode lines 131. Each data line 171 has an end portion 179 having a large area for contact with another layer or an external device and it includes a plurality of pairs of oblique portions and a plurality of longitudinal portions such that it curves periodically. A pair of oblique portions are connected to each other to form a chevron and opposite ends of the pair of oblique portions are connected to respective longitudinal portions. The oblique portions of the data lines 171 make an angle of about 45 degrees with the gate lines 121, and the longitudinal portions cross over the gate electrodes 124.

Each drain electrode 175 includes a rectangular expansion overlapping a storage electrode 133. The edges of the expansion of the drain electrode 175 are substantially parallel to the edges of the storage electrodes 133. Each longitudinal portion of the data lines 171 includes a plurality of projections such that the longitudinal portion including the projections forms a source electrode 173 partly enclosing an end portion of a drain electrode 175. Each set of a gate electrode 124, a source electrode 173, and a drain electrode 175 along with a projection 154 of a semiconductor stripe 151 form a TFT having a channel formed in the semiconductor projection 154 disposed between the source electrode 173 and the drain electrode 175.

The data lines 171 and the drain electrodes 175 also include a lower film 711 and 751 preferably made of Mo, Mo alloy or Cr and an upper film 712 and 752 located thereon and preferably made of Al containing metal. In FIGS. 4 and 5, the lower and the upper films of the source electrodes 173 are indicated by reference numerals 731 and 732, respectively, and the lower and the upper films of the end portions 179 of the data lines 171 are indicated by reference numerals 791 and 792, respectively. Portion of the upper films 792, 752 of the expansions 179 of the data lines 171 and the drain electrodes 175 are removed to expose the underlying portions of the lower films 791 and 751.

Like the gate lines 121 and the storage electrode lines 131, the data lines 171 and the drain electrodes 175 have inclined lateral sides, and the inclination angles thereof range about 30-80 degrees.

The ohmic contacts 161 and 165 are interposed only between the underlying semiconductor stripes 151 and the overlying data lines 171 and the overlying drain electrodes 175 thereon and reduce the contact resistance therebetween.

A passivation layer 180 is formed on the data lines 171 and the drain electrodes 175, and exposed portions of the semiconductor stripes 151, which are not covered with the data lines 171 and the drain electrodes 175. The passivation layer 180 is preferably made of photosensitive organic material having a good flatness characteristic, low dielectric insulating material such as a-Si:C:O and a-Si:O:F formed by plasma enhanced chemical vapor deposition (PECVD), or inorganic material such as silicon nitride and silicon oxide. The passivation layer 180 may have a double-layered structure including a lower inorganic film and an upper organic film.

The passivation layer 180 has a plurality of contact holes 181b and 183b exposing the drain electrodes 175 and the end portions 179 of the data lines 171, respectively. The passivation layer 180 and the gate insulating layer 140 have a plurality of contact holes 182b exposing the end portions 129 of the gate lines 121. The contact holes 181b, 182b and 183b can have various shapes such as polygon or circle. The area of each contact hole 182b or 183b is preferably equal to or larger than 0.5 mm×15 μm and not larger than 2 mm×60 μm. The sidewalls 181a, 182a and 183a of the contact holes 181b, 182b and 183b are inclined with an angle of about 30-85 degrees or have stepwise profiles.

A plurality of protrusions 280 are formed on the passivation layer 180 opposite the data lines 171. The protrusions 280 may be wider than the data lines and decrease parasitic capacitances generated by the data lines 171 to reduce lateral field and texture.

A plurality of pixel electrodes 190 and a plurality of contact assistants 81 and 82, which are preferably made of ITO or IZO, are formed on the passivation layer 180.

Each pixel electrode 190 is located substantially in an area enclosed by the data lines 171 and the gate lines 121, and thus it also forms a chevron. The pixel electrodes 190 cover the storage electrode lines 131 including the storage electrodes 133 and the expansions of the drain electrodes 175 and have chamfered edges substantially parallel to edges of the storage electrodes 133 that are close to the chamfered edges.

The pixel electrodes 190 are physically and electrically connected to the drain electrodes 175 through the contact holes 181 such that the pixel electrodes 190 receive the data voltages from the drain electrodes 175. The pixel electrodes 190 supplied with the data voltages generate electric fields in cooperation with the common electrode 270, which reorient liquid crystal molecules disposed therebetween.

A pixel electrode 190 and a common electrode form a capacitor called a "liquid crystal capacitor," which stores applied voltages after turn-off of the TFT. An additional capacitor called a "storage capacitor," which is connected in parallel to the liquid crystal capacitor, is provided for enhancing the voltage storing capacity. The storage capacitors are implemented by overlapping the pixel electrodes 190 with the storage electrode lines 131. The capacitances of the storage capacitors, i.e., the storage capacitances are increased by providing the projections (i.e., the storage electrodes) 133 at the storage electrode lines 131, elongating the drain electrodes 175 connected to the pixel electrodes 190, and providing the expansions at the drain electrodes 175 overlapping the storage electrodes 133 of the storage electrode lines 131 for decreasing the distance between the terminals and increasing the overlapping areas.

The pixel electrodes 190 overlap the data lines 171 as well as the gate lines 121 to increase aperture ratio.

The protrusions 280 are disposed between the pixel electrodes 190, and the pixel electrodes 190 may have cutouts (not shown) and additional protrusions may be disposed on the cutouts. In this case, the storage electrode lines 131 are preferably disposed under the cutouts.

The contact assistants 81 and 82 are connected to the exposed end portions 129 of the gate lines 121 and the exposed end portions 179 of the data lines 171 through the contact holes 181 and 182, respectively. The contact assistants 81 and 82 and the contact holes 182b and 183b are provided for signal communication between the signal lines 121 and 171 and external driving circuits mounted on the TFT array panel 100 or flexible printed circuit films that are attached to the TFT array panel 100. When the driving circuits are formed on the substrate 110 along with the signal lines 121 and 171 and the TFTs, the contact assistants 81 and 82 and the contact holes 182b and 183b need not be provided.

Finally, an alignment layer 11 is formed on the pixel electrodes 190, the contact assistants 81 and 82, and the passivation layer 180.

The description of the common electrode panel 200 follows with reference to FIGS. 2, 4 and 5.

A light blocking member called a light blocking member 220 is formed on an insulating substrate 210 such as transparent glass and it includes a plurality of oblique portions facing the oblique portions of the data lines 171 and a plurality of right-angled-triangular portions facing the TFTs and the longitudinal portions of the data lines 171 such that the light blocking member 220 prevents light leakage between the pixel electrodes 190 and defines open areas facing the pixel electrodes 190. Each of the triangular portions of the light blocking member 220 has a hypotenuse parallel to a chamfered edge of a pixel electrode 190.

A plurality of color filters 230 are formed on the substrate 210 and the light blocking member 220 and it is disposed substantially in the open areas defined by the light blocking member 220. The color filters 230 disposed in adjacent two data lines 171 and arranged in the longitudinal direction may be connected to each other to form a stripe. Each color filter 230 may represent one of three primary colors such as red, green and blue colors.

An overcoat 250 preferably made of organic material is formed on the color filters 230 and the light blocking member 220. The overcoat 250 protects the color filters 230 and prevents the color filters 230 from contaminating other layers and it has a flat top surface.

A common electrode 270 preferably made of transparent conductive material such as ITO and IZO is formed on the overcoat 250. The common electrode 270 is supplied with the common voltage and it has a plurality of chevron-like cutouts 271. Each cutout 271 includes a pair of oblique portions connected to each other, a transverse portion connected to one of the oblique portions, and a longitudinal portion connected to the other of the oblique portions. The oblique portions of the cutout 271 extend substantially parallel to the oblique portions of the data lines 171 and face a pixel electrode 190 so that they may bisect the pixel electrode 190 into left and right halves. The transverse and the longitudinal portions of the cutout 271 are aligned with transverse and longitudinal edges of the pixel electrode 190, respectively, and they make obtuse angles with the oblique portions of the cutout 190.

A homogeneous or homeotropic alignment layer 21 is coated on the common electrode 270.

A pair of polarizers 12 and 22 are provided on outer surfaces of the panels 100 and 200 such that their transmissive axes are crossed and one of the transmissive axes is parallel to the gate lines 121.

The LCD may further include at least one retardation film for compensating the retardation of the LC layer 3 and a backlight unit for providing light for the LCD.

The LC layer 3 has negative dielectric anisotropy and the LC molecules in the LC layer 3 are aligned such that their long axes are vertical to the surfaces of the panels 100 and 200 in absence of electric field.

Upon application of the common voltage to the common electrode 270 and a data voltage to the pixel electrodes 190, a primary electric field substantially perpendicular to the surfaces of the panels 100 and 200 is generated. The LC molecules tend to change their orientations in response to the electric field such that their long axes are perpendicular to the field direction. In the meantime, the cutouts 271 of the common electrode 270 and the edges of the pixel electrodes 190 distort the primary electric field to have a horizontal component which determines the tilt directions of the LC molecules. The horizontal component of the primary electric field is perpendicular to the edges of the cutouts 271 and the edges of the pixel electrodes 190.

In the meantime, the protrusions 280 give pretilt angles to the LC molecules to facilitate the tilt of the LC molecules. In addition, the protrusions 280 may strengthen the horizontal component of the primary field. Accordingly, the width of the cutouts 91-93 can be decreased to improve the aperture ratio, thereby increasing the luminance of the LCD.

Accordingly, four sub-regions having different tilt directions, which are partitioned by edges of a pixel electrode 190, a cutout 271 bisecting the pixel electrode 190, and an imaginary transverse center line passing through the meeting point of the oblique portions of the cutout 271, are formed in a pixel region of the LC layer 3, which are located on the pixel electrode 190. Each sub-region has two major edges defined by the cutout 271 and an oblique edge of the pixel electrode 190, respectively.

In the meantime, the direction of a secondary electric field due to the voltage difference between the pixel electrodes 190 is perpendicular to the edges of the cutouts 271. Accordingly, the field direction of the secondary electric field coincides that of the horizontal component of the primary electric field. Consequently, the secondary electric field between the pixel electrodes 190 enhances the determination of the tilt directions of the LC molecules.

Since the LCD performs inversion such as dot inversion, column inversion, etc., adjacent pixel electrodes are supplied with data voltages having opposite polarity with respect to the common voltage and thus a secondary electric field between the adjacent pixel electrodes is almost always generated to enhance the stability of the domains.

Since the tilt directions of all domains make an angle of about 45 degrees with the gate lines 121, which are parallel to or perpendicular to the edges of the panels 100 and 200, and the 45-degree intersection of the tilt directions and the transmissive axes of the polarizers minimizes light leakage, the polarizers can be attached such that the transmissive axes of the polarizers are parallel to or perpendicular to the edges of the panels 100 and 200 and it reduces the production cost.

The resistance increase of the data lines 171 due to the curving can be compensated by widening the data lines 171 since distortion of the electric field and increase of the parasitic capacitance due to the increase of the width of the data lines 171 can be compensated by maximizing the size of the pixel electrodes 190 and by adapting a thick organic passivation layer.

A method of manufacturing the TFT array panel shown in FIGS. 1-5 according to an embodiment of the present invention will be now described in detail with reference to FIGS. 6A, 6B, 7A and 7B, and 8A and 8B as well as FIGS. 1-5.

Figure 6A:
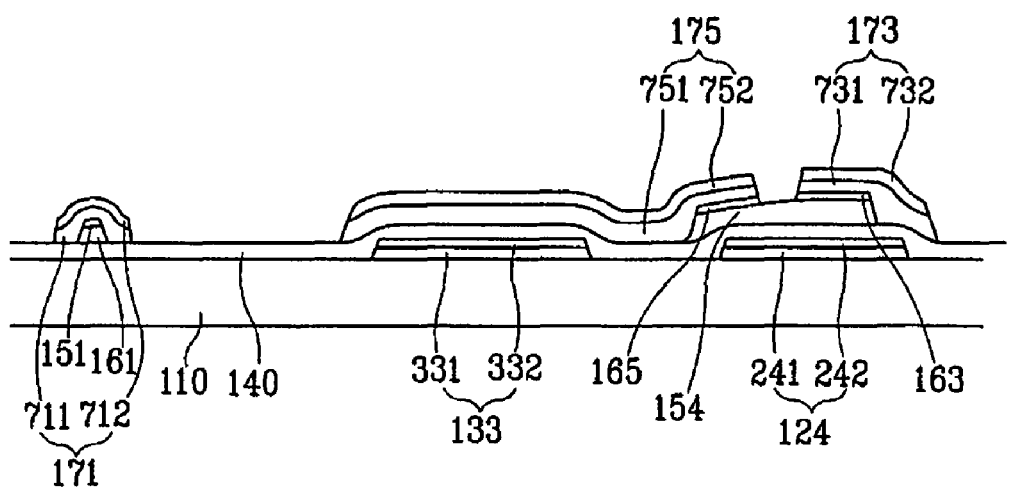
FIGS. 6A and 6B are sectional views of the TFT array panel shown in FIGS. 1, 4 and 5 taken along the line IV-IV' and the lines V-V' and V'-V", respectively, in an intermediate step of a manufacturing method thereof according to an embodiment of the present invention.
Figure 6B:
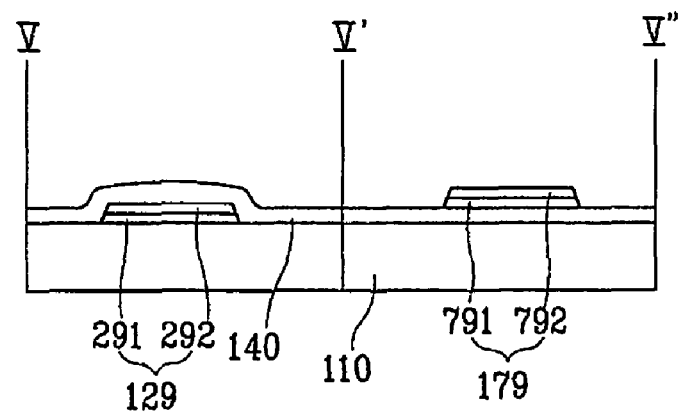
Figure 7A:
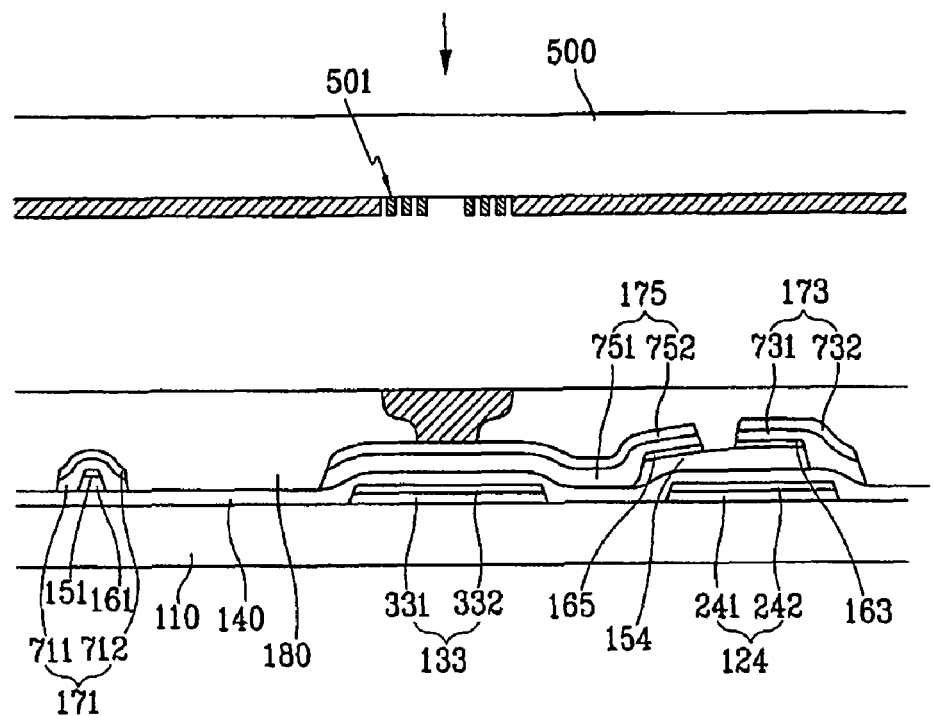
FIGS. 7A and 7B are sectional views of the TFT array panel shown in FIGS. 1, 4 and 5 taken along the line IV-IV' and the lines V-V' and V'-V", respectively, in the step of the manufacturing method following the step shown in FIGS. 6A and 6B.
Figure 7B:
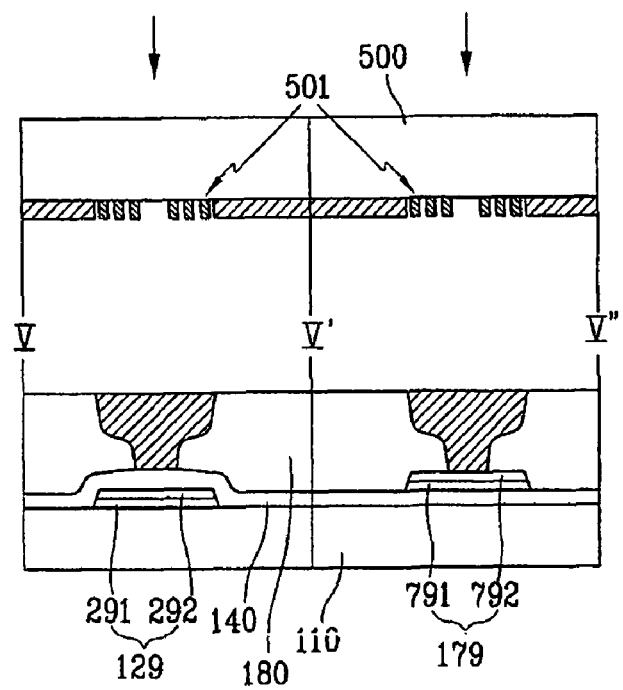

FIGS. 6A and 6B are sectional views of the TFT array panel shown in FIGS. 1, 4 and 5 taken along the line IV-IV' and the lines V-V' and V'-V''', respectively, in an intermediate step of a manufacturing method thereof according to an embodiment of the present invention, FIGS. 7A and 7B are sectional views of the TFT array panel shown in FIGS. 1, 4 and 5 taken along the line IV-IV' and the lines V-V' and V'-V''', respectively, in the step of the manufacturing method following the step shown in FIGS. 6A and 6B, and FIGS. 8A and 8B are sectional views of the TFT array panel shown in FIGS. 1, 4 and 5 taken along the line IV-IV' and the lines V-V' and V'-V''', respectively, in the step of the manufacturing method following the step shown in FIGS. 7A and 7B.

Referring to FIGS. 1, 6A and 6B, a lower conductive film preferably made of Cr, Mo, or Mo alloy and an upper conductive film preferably made of Al containing metal or Ag containing metal are sputtered in sequence on an insulating substrate 110 and they are wet or dry etched in sequence to form a plurality of gate lines 121, each including a plurality of gate electrodes 124 and an expansion 129, and a plurality of storage electrode lines 131 including a plurality of storage electrodes 133. In FIGS. 6A and 6B, the lower and the upper films of the gate electrodes 124 are indicated by reference numerals 241 and 242, respectively, the lower and the upper films of the expansions 129 are indicated by reference numerals 291 and 292, respectively, and the lower and the upper films of the storage electrodes 133 are indicated by reference numerals 331 and 332, respectively.

After sequential deposition of a gate insulating layer 140 with thickness of about 1,500-5,000 Å, an intrinsic a-Si layer with thickness of about 500-2,000 Å, and an extrinsic a-Si layer with thickness of about 300-600 Å, the extrinsic a-Si layer and the intrinsic a-Si layer are photo-etched to form a plurality of extrinsic semiconductor stripes and a plurality of intrinsic semiconductor stripes 151 including a plurality of projections 154 on the gate insulating layer 140.

Subsequently, two conductive films including a lower conductive film and an upper conductive film and having a thickness of 1,500-3,000 Å are sputtered in sequence and patterned to form a plurality of date lines 171, each including a plurality of source electrodes 173 and an expansion 179, and a plurality of drain electrodes 175. The lower conductive film is preferably made of Cr, Mo, or Mo alloy, and the upper conductive film is preferably made of Al containing metal or Ag containing metal. In FIGS. 6A and 6B, the lower and the upper films of the drain electrodes 171 are indicated by reference numerals 711 and 712, respectively, the lower and the upper films of the source electrodes 173 are indicated by reference numerals 731 and 732, respectively, the lower and the upper films of the drain electrodes 175 are indicated by reference numerals 751 and 752, respectively, and the lower and the upper films of the end portions 179 of the data lines 171 are indicated by reference numerals 791 and 792, respectively.

Thereafter, portions of the extrinsic semiconductor stripes, which are not covered with the data lines 171 and the drain electrodes 175, are removed to complete a plurality of ohmic contact stripes 161 including a plurality of projections 163 and a plurality of ohmic contact islands 165 and to expose portions of the intrinsic semiconductor stripes 151. Oxygen plasma treatment preferably follows in order to stabilize the exposed surfaces of the semiconductor stripes 151.

Referring to FIGS. 1, 7A and 7B, a passivation layer 180 made of a photosensitive organic insulator is coated and exposed through a photo-mask 500 having a plurality of transmissive areas 502 and a plurality of slit areas 501 disposed around the transmissive areas 502. Accordingly, portions of the passivation layer 180 facing the transmissive areas 502 absorb the full energy of the light, while portions of the passivation layer 180 facing the slit areas 501 partially absorb the light energy. The passivation layer 180 is then developed to form a plurality of contact holes 181b and 183b exposing portions of the drain electrodes 175 and portions of the expansions 179 of the data lines 171, respectively, and to form upper portions of a plurality of contact holes 182b exposing portions of the gate insulating layer 140 disposed on the expansions 129 of the gate lines 121. Since the portions of the passivation layer 180 facing the transmissive areas 502 are removed to its full thickness, while the portions facing the slit areas 501 remain to have reduced thickness, sidewalls 181a, 182a and 183a of the contact holes 181b, 182b and 183b have stepped profiles.

Figure 8A:
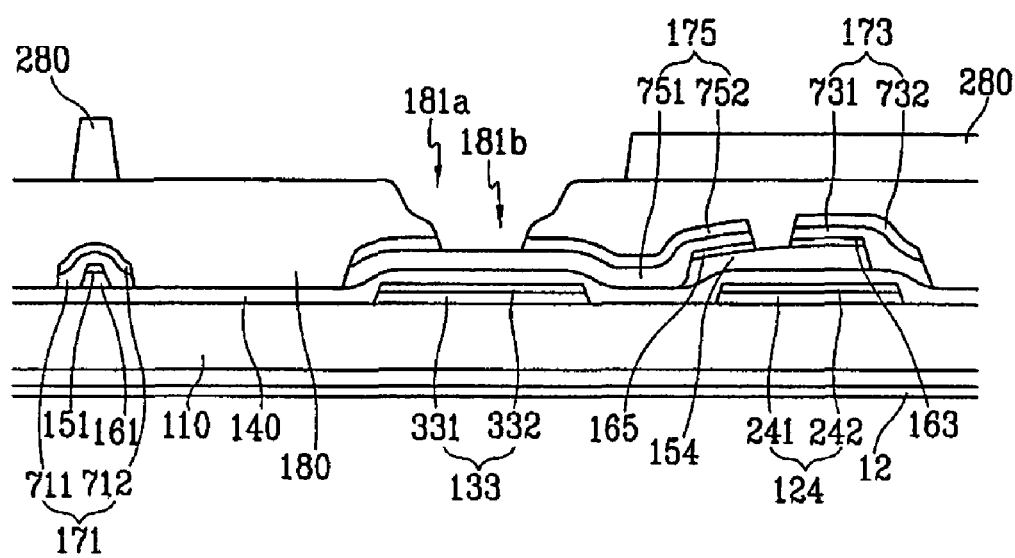
FIGS. 8A and 8B are sectional views of the TFT array panel shown in FIGS. 1, 4 and 5 taken along the line IV-IV' and the lines V-V' and V'-V", respectively, in the step of the manufacturing method following the step shown in FIGS. 7A and 7B.
Figure 8B:
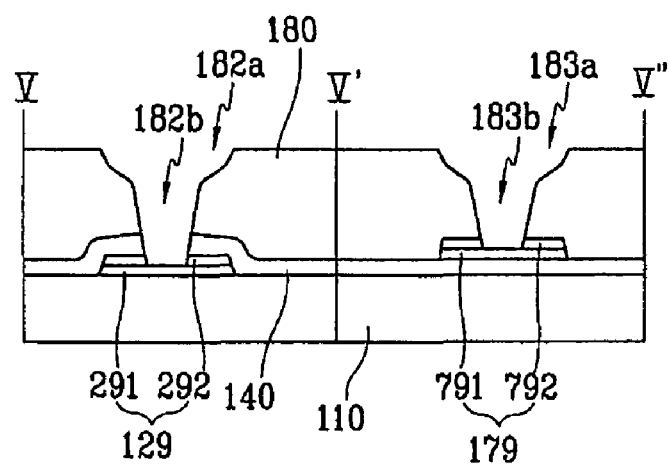

Referring to FIGS. 1, 8A and 8B, an organic layer is coated and patterned by photolithography to form a plurality of protrusions 280.

After removing the exposed portions of the gate insulating layer 140 to expose the underlying portions of the expansions 129 of the gate insulating layer 140, the exposed portions of the upper conductive films 752, 792 and 292 of the drain electrodes 175, the expansions 179 of the data lines 171, and the expansions 129 of the gate lines 121 are removed to expose underlying portions of the lower conductive films 751, 791 and 291 of the drain electrodes 175, the expansions 179 of the data lines 171, and the expansions 129 of the gate lines 121.

Next, a plurality of pixel electrodes 190 and a plurality of contact assistants 92 and 82 are formed on the passivation layer 180 and on the exposed portions of the lower conductive films 751, 791 and 291 of the drain electrodes 175, the expansions 129 of the gate lines 121, and the expansions 179 of the data lines 171 by sputtering and photo-etching an IZO or ITO layer with thickness of about 400-500 Å as shown in FIGS. 1, 4 and 5.

Finally, an alignment layer 11 is formed on the pixel electrodes 190, the protrusions 280, and the passivation layer 180.

An LCD according to another embodiment of the present invention will be described in detail with reference to FIGS. 9-11.

Figure 9:
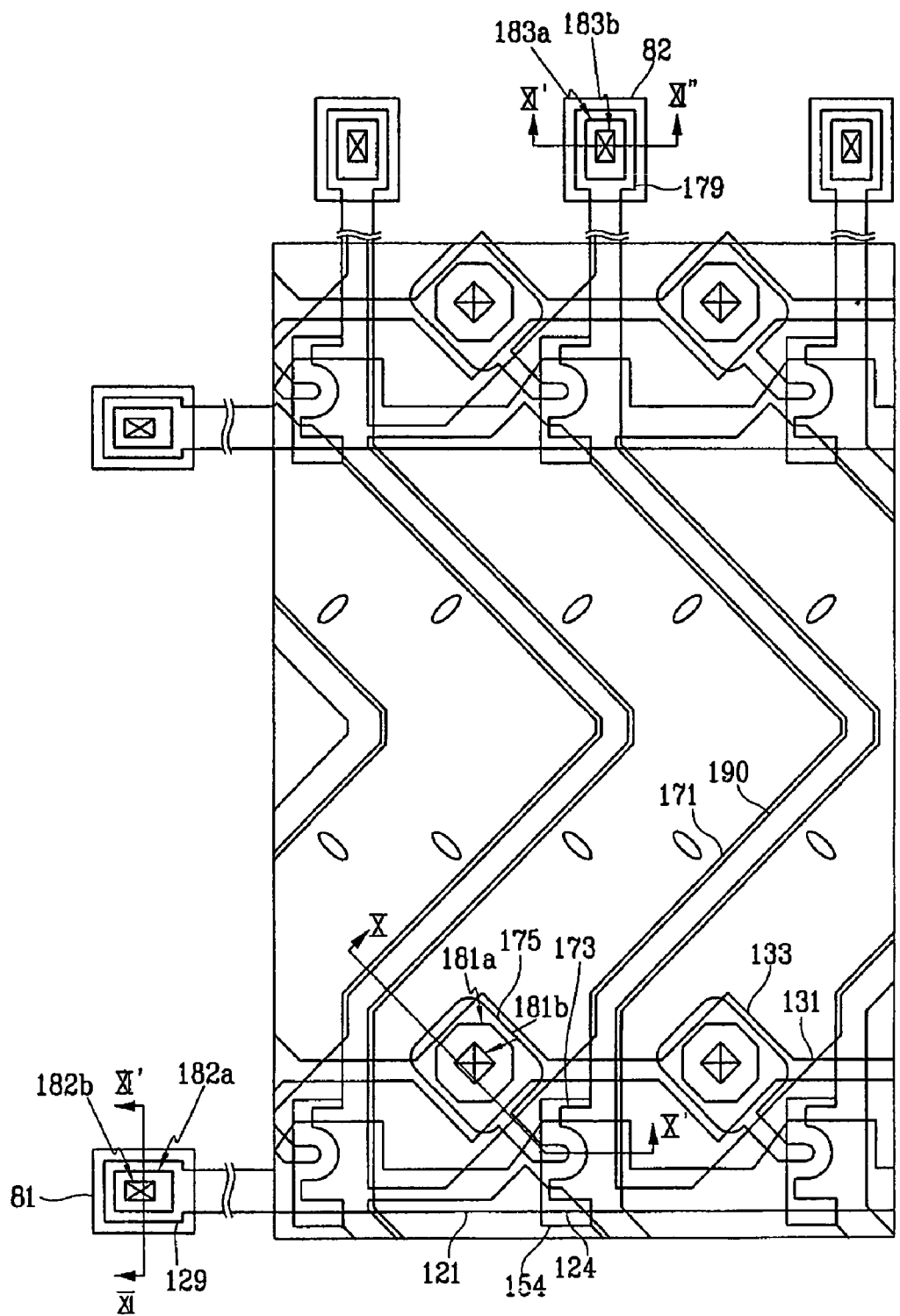
FIG. 9 is a layout view of an LCD according to another embodiment of the present invention.
Figure 10:
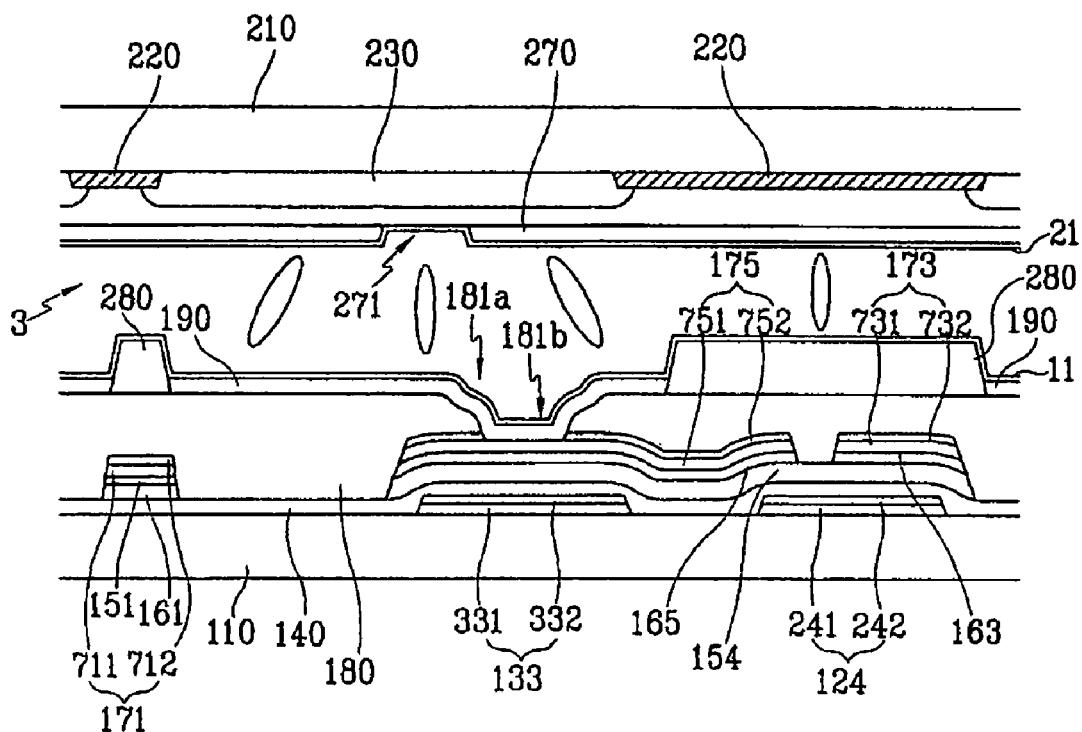
FIG. 10 is a sectional view of the LCD shown in FIG. 9 taken along the line X-X"
Figure 11:
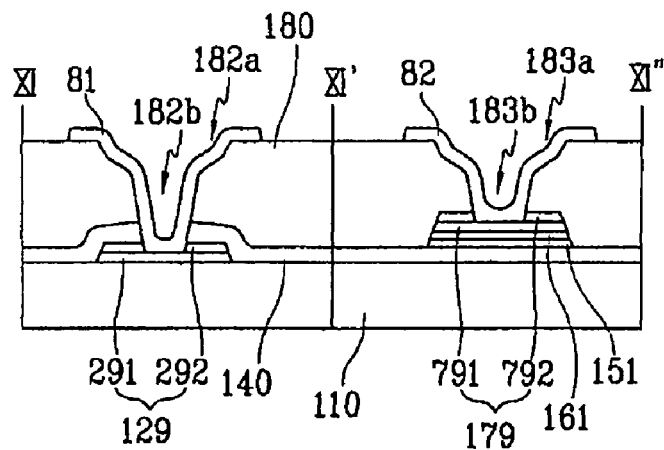
FIG. 11 is a sectional view of the LCD shown in FIG. 9 taken along the lines XI-XI' and XI'-XI"

FIG. 8 is a layout view of an LCD according to another embodiment of the present invention, FIG. 10 is a sectional view of the LCD shown in FIG. 9 taken along the line X-X', and FIG. 11 is a sectional view of the LCD shown in FIG. 9 taken along the lines XI-XI' and XI'-XI".

Referring to FIGS. 9-11, an LCD according to this embodiment also includes a TFT array panel 100, a common electrode panel 200, and a LC layer 3 interposed therebetween.

Layered structures of the panels 100 and 200 according to this embodiment are almost the same as those shown in FIGS. 1-5.

Regarding the TFT array panel 100, a plurality of gate lines 121 including a plurality of gate electrodes 124 and a plurality of storage electrode lines 131 including a plurality of storage electrodes 133 are formed on a substrate 110, and a gate insulating layer 140, a plurality of semiconductor stripes 151 including a plurality of projections 154, and a plurality of ohmic contact stripes 161 including a plurality of projections 163 and a plurality of ohmic contact islands 165 are sequentially formed thereon. A plurality of data lines 171 including a plurality of source electrodes 173 and a plurality of drain electrodes 175 are formed on the ohmic contacts 161 and 165, and a passivation layer 180 is formed thereon. A plurality of contact holes 181b, 182b and 183b are provided at the passivation layer 180 and the gate insulating layer 140, and a plurality of protrusions 280 are formed on the passivation layer 180. A plurality of pixel electrodes 190 and a plurality of contact assistants 81 and 82 are formed on the passivation layer 180 and an alignment layer 11 is formed thereon.

Regarding the common electrode panel 200, a light blocking member 220, a plurality of color filters 230, an overcoat 250, a common electrode 270, and an alignment layer 21 are formed on an insulating substrate 210.

Different from the LCD shown in FIGS. 1-5, the semiconductor stripes 151 have almost the same planar shapes as the data lines 171 and the drain electrodes 175 as well as the underlying ohmic contacts 161 and 165,. However, the projections 154 of the semiconductor stripes 151 include some exposed portions, which are not covered with the data lines 171 and the drain electrodes 175, such as portions located between the source electrodes 173 and the drain electrodes 175.

Many of the above-described features of the LCD shown in FIGS. 1-5 may be appropriate to the LCD shown in FIGS. 9-11.

Now, a method of manufacturing the TFT array panel shown in FIGS. 9-11 according to an embodiment of the present invention will be described in detail.

Figure 12A:
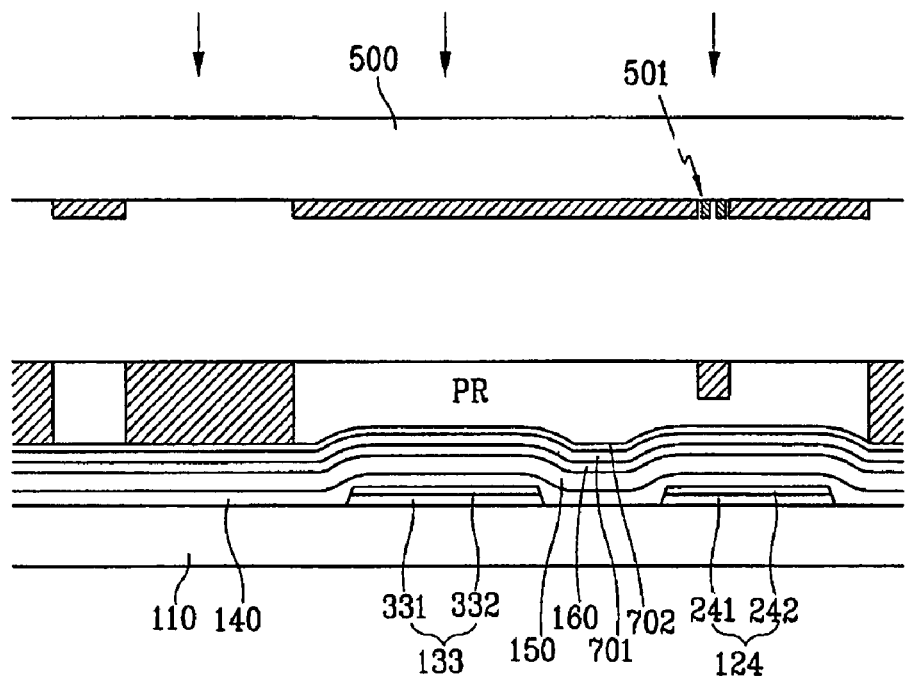
FIGS. 12A and 12B are sectional views of the TFT array panel shown in FIGS. 9-11 taken along the line X-X' and the lines XI-XI' and XI'-XI", respectively, in an intermediate step of a manufacturing method thereof according to an embodiment of the present invention.
Figure 12B:
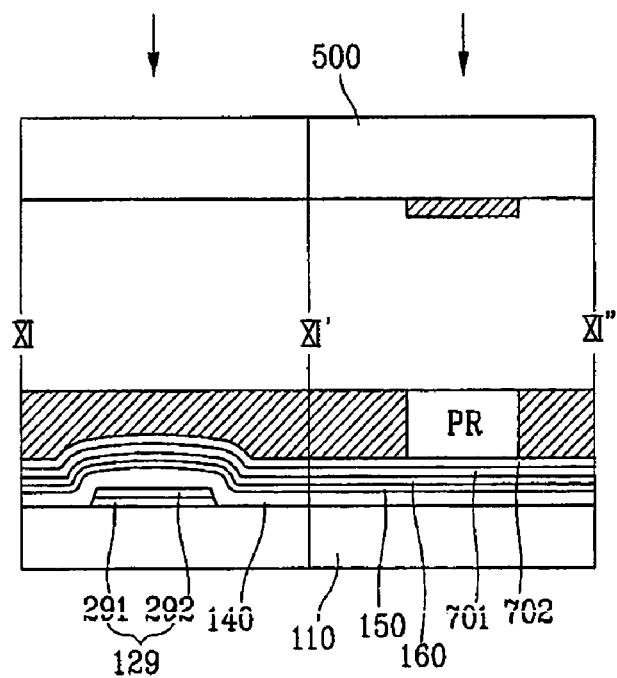
Figure 13A:
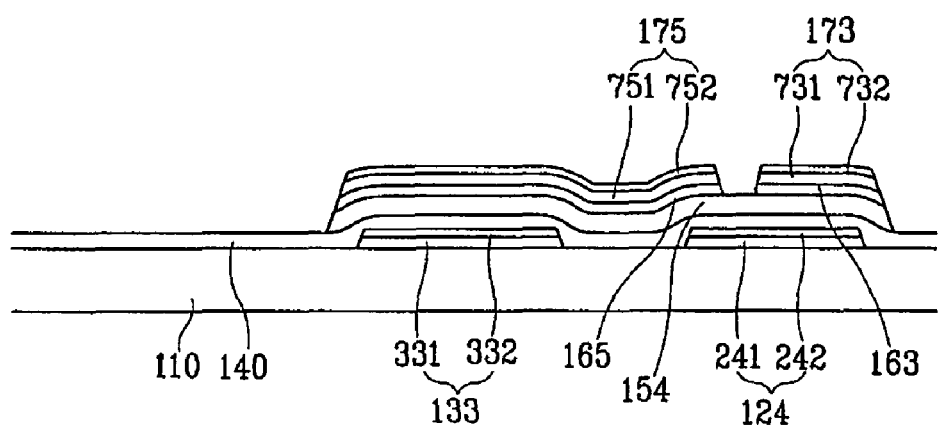
FIGS. 13A and 13B are sectional views of the TFT array panel shown in FIGS. 9-11 taken along the line X-X' and the lines XI-XI' and XI'-XI" in the step of the manufacturing method following the step shown in FIGS. 12A and 12B.
Figure 13B:
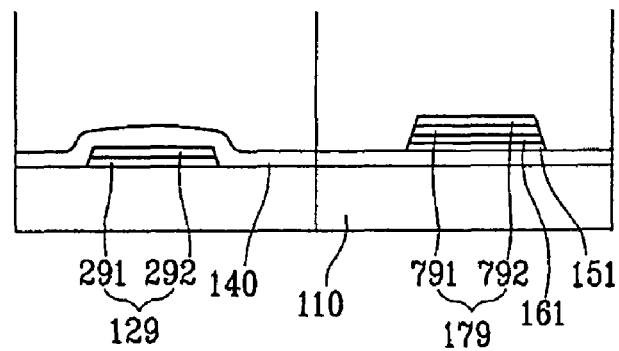
Figure 14A:
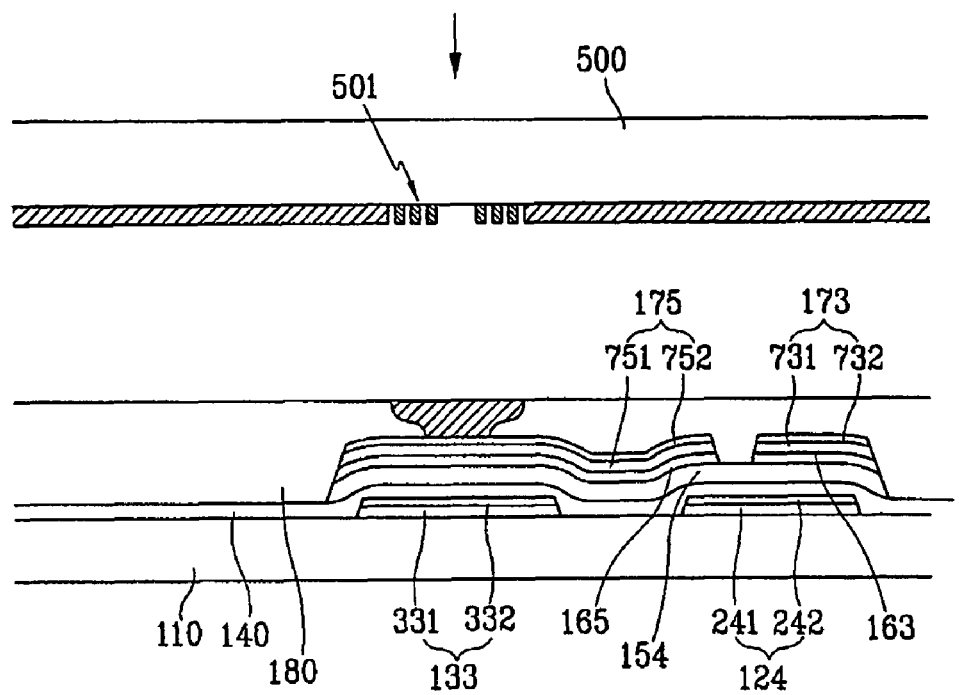
FIGS. 14A and 14B are sectional views of the TFT array panel shown in FIGS. 9-11 taken along the line X-X' and the lines XI-XI' and XI'-XI" in the step of the manufacturing method following the step shown in FIGS. 13A and 13B.
Figure 14B:
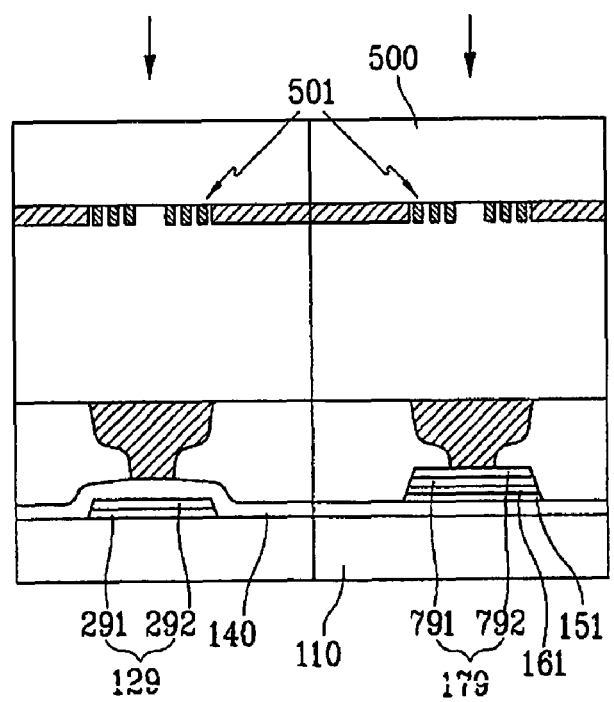
Figure 15A:
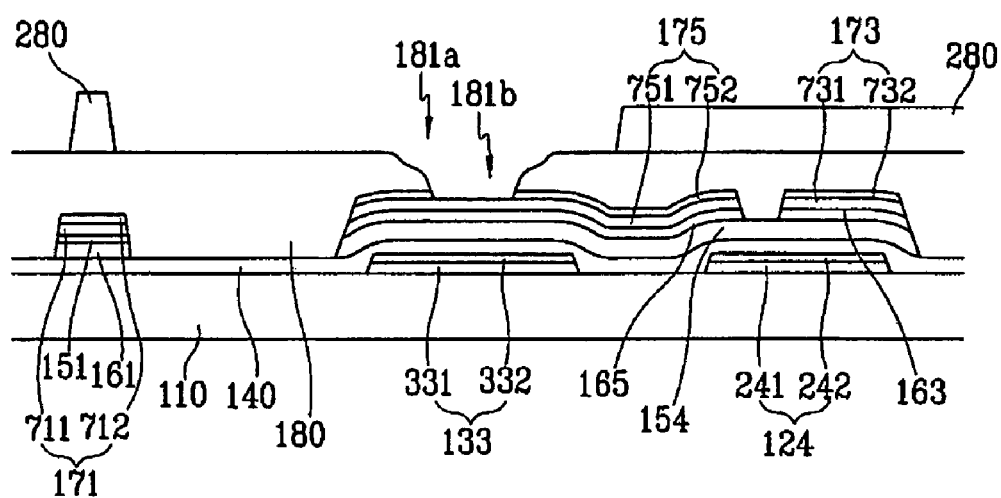
FIGS. 15A and 15B are sectional views of the TFT array panel shown in FIGS. 9-11 taken along the line X-X' and the lines XI-XI' and XI'-XI" in the step of the manufacturing method following the step shown in FIGS. 14A and 14B.
Figure 15B:
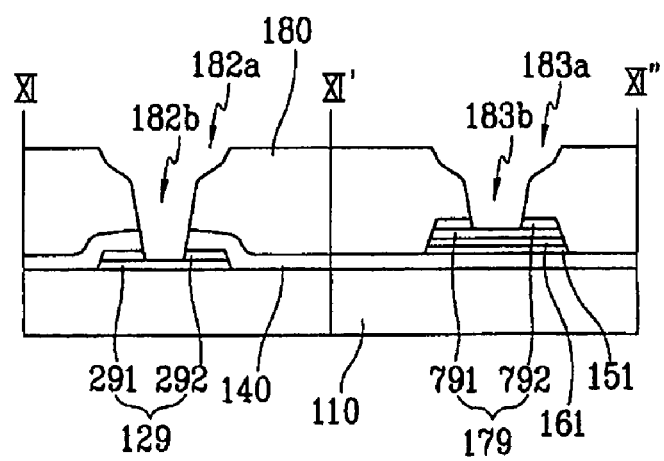

FIGS. 12A and 12B are sectional views of the TFT array panel shown in FIGS. 9-11 taken along the line X-X' and the lines XI-XI' and XI'-XI", respectively, in an intermediate step of a manufacturing method thereof according to an embodiment of the present invention; FIGS. 13A and 13B are sectional views of the TFT array panel shown in FIGS. 9-11 taken along the line X-X' and the lines XI-XI' and XI'-XI" in the step of the manufacturing method following the step shown in FIGS. 12A and 12B; FIGS. 14A and 14B are sectional views of the TFT array panel shown in FIGS. 9-11 taken along the line X-X' and the lines XI-XI' and XI'-XI" in the step of the manufacturing method following the step shown in FIGS. 13A and 13B; and FIGS. 15A and 15B are sectional views of the TFT array panel shown in FIGS. 9-11 taken along the line X-X' and the lines XI-XI' and XI'-XI" in the step of the manufacturing method following the step shown in FIGS. 14A and 14B.

Referring to FIGS. 12A and 12B, two conductive films, a lower conductive film and an upper conductive film are sputtered in sequence on an insulating substrate 110 and they are wet or dry etched in sequence to form a plurality of gate lines 121, each including a plurality of gate electrodes 124 and an expansion 129, and a plurality of storage electrode lines 131 including a plurality of storage electrodes 133. In FIGS. 12A and 12B, the lower and the upper films of the gate electrodes 124 are indicated by reference numerals 241 and 242, respectively, the lower and the upper films of the expansions 129 are indicated by reference numerals 291 and 292, respectively, and the lower and the upper films of the storage electrodes 133 are indicated by reference numerals 331 and 332, respectively.

Next, a gate insulating layer 140, an intrinsic a-Si layer 150, and an extrinsic a-Si layer 160 are sequentially deposited by CVD such that the layers 140, 150 and 160 bear thickness of about 1,500-5,000 Å, about 500-2,000 Å and about 300-600 Å, respectively. A conductive layer 170 including a lower film 701 and an upper film 702 is deposited by sputtering, and a photoresist film with the thickness of about 1-2 microns is coated on the conductive layer 170.

The photoresist film is exposed to light through an exposure mask 600 including slit areas 601, and developed such that the developed photoresist PR has a position dependent thickness. The photoresist shown in FIGS. 12A and 12B includes a plurality of first to third portions with decreased thickness. The first portions are located on first areas (referred to as "wire areas" hereinafter) and the second portions are located on second areas (referred to as "channel areas" hereinafter), respectively, while the third portions located on remaining third areas are not illustrated in the figures since they have substantially zero thickness to expose underlying portions of the conductive layer 170.

The different thickness of the photoresist PR enables to selectively etch the underlying layers when using suitable process conditions. Therefore, a plurality of data lines 171 including a plurality of source electrodes 173, and a plurality of drain electrodes 175 as well as a plurality of ohmic contact stripes 161 including a plurality of projections 163, a plurality of ohmic contact islands 165 and a plurality of semiconductor stripes 151 including a plurality of projections 154 are obtained by a series of etching steps as shown in FIGS. 13A and 13B. In FIGS. 13A and 13B, the lower and the upper films of the drain electrodes 171 are indicated by reference numerals 711 and 712, respectively, the lower and the upper films of the source electrodes 173 are indicated by reference numerals 731 and 732, respectively, the lower and the upper films of the drain electrodes 175 are indicated by reference numerals 751 and 752, respectively, and the lower and the upper films of the end portions 179 of the data lines 171 are indicated by reference numerals 791 and 792, respectively.

For descriptive purpose, portions of the conductive layer 170, the extrinsic a-Si layer 160, and the intrinsic a-Si layer 150 on the wire areas are called first portions, portions of the conductive layer 170, the extrinsic a-Si layer 160, and the intrinsic a-Si layer 150 on the channel areas are called second portions, and portions of the conductive layer 170, the extrinsic a-Si layer 160, and the intrinsic a-Si layer 150 on the third areas are called third portions.

An exemplary sequence of forming such a structure is as follows:

(1) Removal of third portions of the conductive layer 170, the extrinsic a-Si layer 160 and the intrinsic a-Si layer 150 on the wire areas;

(2) Removal of the second portions of the photoresist;

(3) Removal of the second portions of the conductive layer 170 and the extrinsic a-Si layer 160 on the channel areas; and (4) Removal of the first portions of the photoresist.

Another exemplary sequence is as follows:

(1) Removal of the third portions of the conductive layer 170;

(2) Removal of the second portions of the photoresist;

(3) Removal of the third portions of the extrinsic a-Si layer 160 and the intrinsic a-Si layer 150;

(4) Removal of the second portions of the conductive layer 170;

(5) Removal of the first portions of the photoresist; and (6) Removal of the second portions of the extrinsic a-Si layer 160.

The first example is described in detail.

At first, the exposed third portions of the conductive layer 170 on the third areas are removed by wet etching or dry etching to expose the underlying third portions of the extrinsic a-Si layer 160. The dry etching may etch out the top portions of the photoresist PR.

Next, the third portions of the extrinsic a-Si layer 160 on the third areas and of the intrinsic a-Si layer 150 are removed preferably by dry etching and the second portions of the photoresist PR are removed to expose the second portions of the conductors 170. The removal of the second portions of the photoresist PR are performed either simultaneously with or independent from the removal of the third portions of the extrinsic a-Si layer 160 and of the intrinsic a-Si layer 150. A gas mixture of $SF_6$ and HCl or a gas mixture of $SF_6$ and $O_2$ can etch the a-Si layers 150 and 160 and the photoresist PR by nearly the same etching ratio. Residue of the second portions of the photoresist PR remained on the channel areas is removed by ashing.

Next, the third portions of the extrinsic a-Si layer 160 on the third areas and of the intrinsic a-Si layer 150 are removed preferably by dry etching and the second portions of the photoresist PR are removed to expose the second portions of the conductors 170. The removal of the second portions of the photoresist PR are performed either simultaneously with or independent from the removal of the third portions of the extrinsic a-Si layer 160 and of the intrinsic a-Si layer 150. A gas mixture of $SF_6$ and HCl or a gas mixture of $SF_6$ and $O_2$ can etch the a-Si layers 150 and 160 and the photoresist PR by nearly the same etching ratio. Residue of the second portions of the photoresist PR remained on the channel areas is removed by ashing.

The semiconductor stripes 151 are completed in this step.

Next, the second portions of the conductors 170 and the extrinsic a-Si layer 160 on the channel areas as well as the first portion of the photoresist PR are removed.

Both the conductors 170 and the extrinsic a-Si layer 160 may be dry etched.

Alternatively, the conductors 170 are wet etched, while the extrinsic a-Si layer 160 is dry etched. Since the wet etch etches out lateral sides of the conductors 170, while the dry etch hardly etch out lateral sides of the extrinsic a-Si layer 160, step-wise lateral profiles are obtained. Examples of the gas mixtures are $CF_4$ and HCl and $CF_4$ and $O_2$, as described above. The latter gas mixture leaves uniform thickness of the intrinsic semiconductor stripes 151.

In this way, each conductor 170 is divided into a data line 171 and a plurality of drain electrodes 175 to be completed, and the extrinsic a-Si layer 160 is divided into an ohmic contact stripe 161 and a plurality of ohmic contact islands 165 to be completed.

Referring to FIGS. 14A and 14B, a passivation layer 180 made of a photosensitive organic insulator is coated and exposed through a photo-mask 900 having a plurality of transmissive areas 902 and a plurality of slit areas 901 disposed around the transmissive areas 902. Accordingly, portions of the passivation layer 180 facing the transmissive areas 902 absorb the full energy of the light, while portions of the passivation layer 180 facing the slit areas 901 partially absorb the light energy. The passivation layer 180 is then developed to form a plurality of contact holes 181b and 183b exposing portions of the drain electrodes 175 and portions of the expansions 179 of the data lines 171, respectively, and to form upper portions of a plurality of contact holes 182b exposing portions of the gate insulating layer 140 disposed on the expansions 129 of the gate lines 121. Since the portions of the passivation layer 180 facing the transmissive areas 902 are removed to its full thickness, while the portions facing the slit areas 901 remain to have reduced thickness, sidewalls 181a, 182a and 183a of the contact holes 181b, 182b and 183b have stepped profiles.

Referring to FIGS. 1, 8A and 8B, an organic layer is coated and patterned by photolithography to form a plurality of protrusions 280.

After removing the exposed portions of the gate insulating layer 140 to expose the underlying portions of the expansions 129 of the gate insulating layer 140, the exposed portions of the upper conductive films 752, 792 and 292 of the drain electrodes 175, the expansions 179 of the data lines 171, and the expansions 129 of the gate lines 121 are removed to expose underlying portions of the lower conductive films 751, 791 and 291 of the drain electrodes 175, the expansions 179 of the data lines 171, and the expansions 129 of the gate lines 121.

The passivation layer 180 may be made of a photo-insensitive organic insulator or inorganic insulator having a low dielectric constant less than 4. In this case, an additional etching step for forming the contact holes 181b, 182b and 183b is required.

A plurality of pixel electrodes 190 and a plurality of contact assistants 92 and 82 are formed on the passivation layer 180 and on the exposed portions of the lower conductive films 751, 791 and 291 of the drain electrodes 175, the expansions 129 of the gate lines 121, and the expansions 179 of the data lines 171 by sputtering and photo-etching an IZO or ITO film with thickness of about 400-500 Å as shown in FIGS. 9-11.

The etching of the IZO film may include wet etching using a Cr etchant such as $HNO_3/(NH_4)_2Ce(NO_3)_6/H_2O$, which does not erode the exposed Al portions of the drain electrodes 175, the gate lines 121, and the data lines 171 through the contact holes 181b, 182b and 183b. A preferred deposition temperature for minimizing the contact resistance ranges from room temperature to about 200° C. A sputtering target for depositing IZO preferably includes $In_2O_3$ and ZnO and the content of ZnO is preferably in a range about 15-20 atomic %.

Nitrogen, which can prevent the formation of metal oxides on the exposed portions of the drain electrodes 175, the gate lines 121, and the data lines 171 through the contact holes 181b, 182b and 183b, is preferably used for a pre-heating process before the deposition of the ITO film or the IZO film.

Finally, an alignment layer 280 is formed thereon.

An LCD according to another embodiment of the present invention will be described in detail with reference to FIGS. 16-18.

Figure 16:
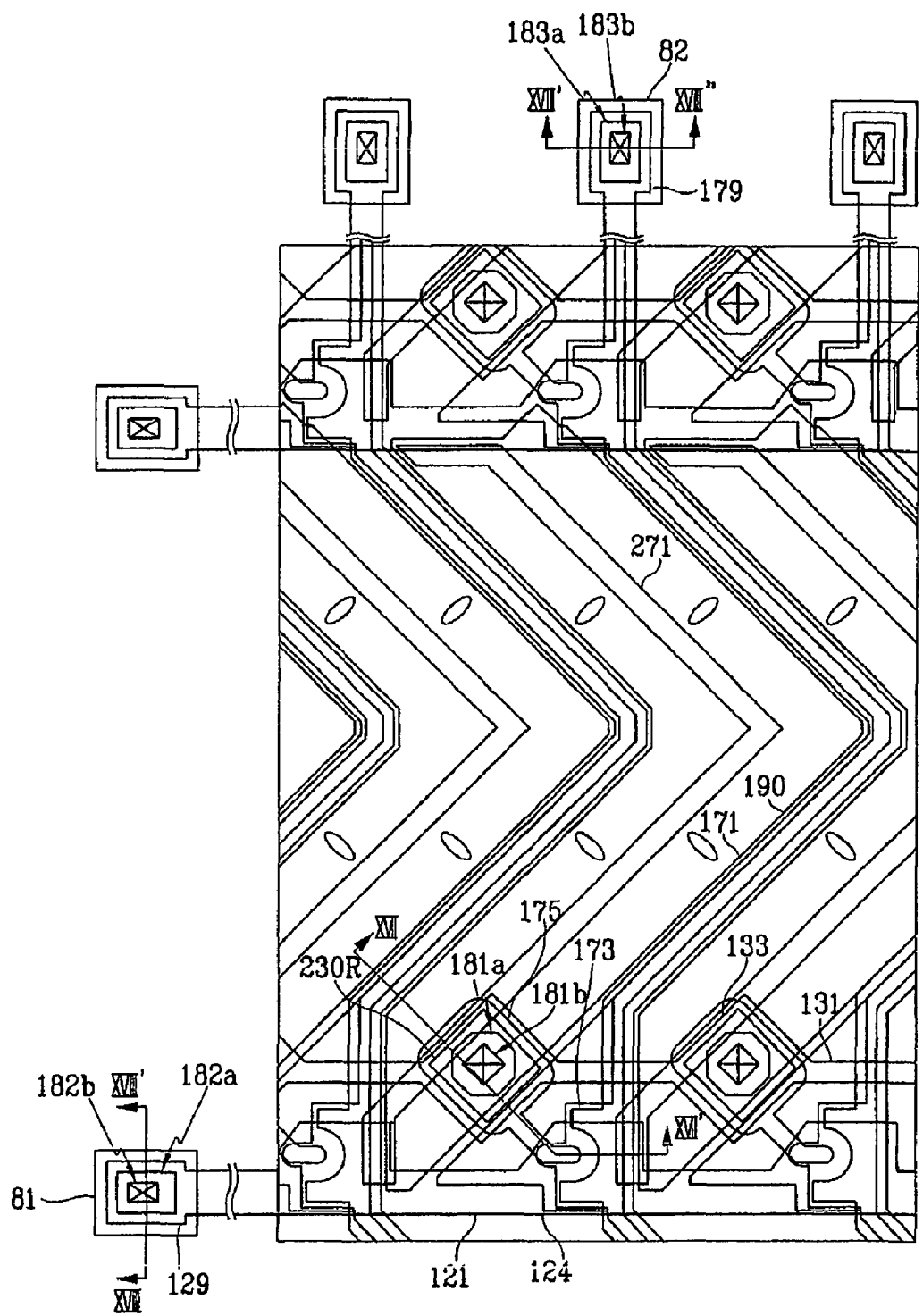
FIG. 16 is a layout view of an LCD according to another embodiment of the present invention.
Figure 17:
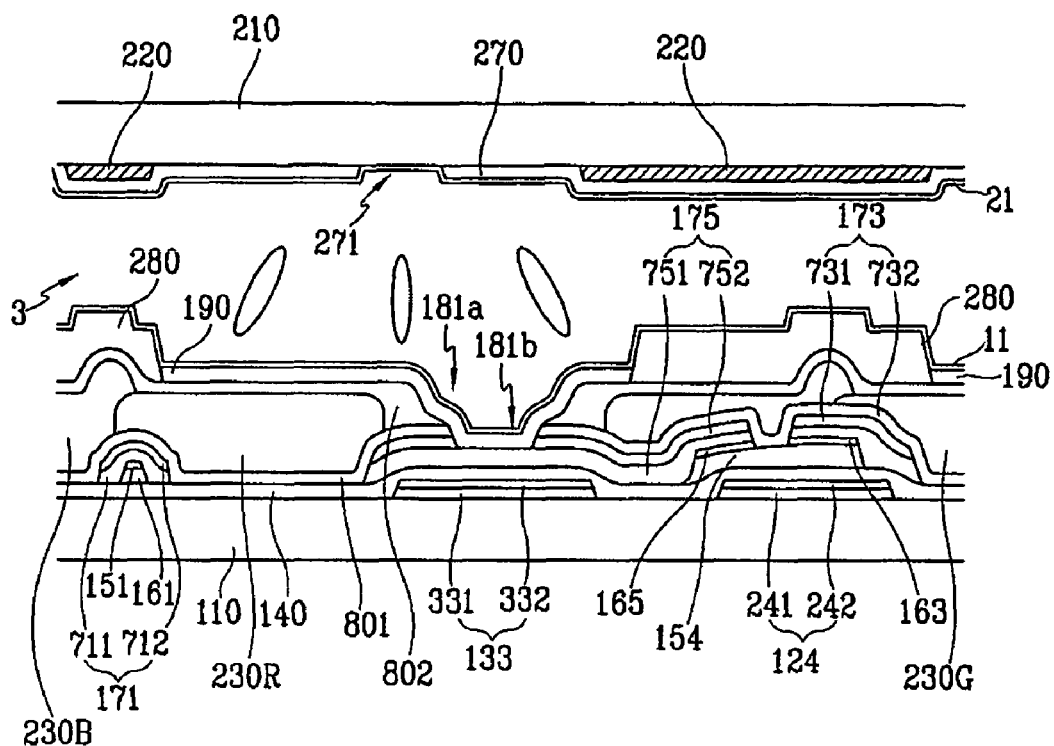
FIG. 17 is a sectional view of the LCD shown in FIG. 16 taken along the line XVII-XVII'.
Figure 18:
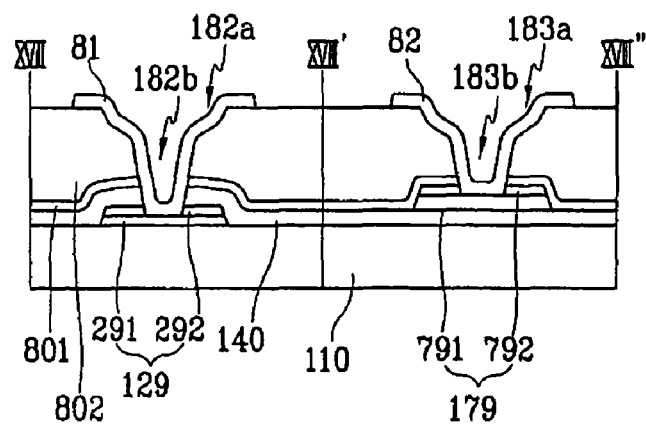
FIG. 18 is a sectional view of the LCD shown in FIG. 16 taken along the lines XVIII-XVIII' and XVIII'-XVIII"

FIG. 16 is a layout view of an LCD according to another embodiment of the present invention, FIG. 17 is a sectional view of the LCD shown in FIG. 16 taken along the line XVII-XVII', and FIG. 18 is a sectional view of the LCD shown in FIG. 16 taken along the lines XVIII-XVIII' and XVIII'-XVIII".

Referring to FIGS. 16-18, an LCD according to this embodiment also includes a TFT array panel 100, a common electrode panel 200, and a LC layer 3 interposed therebetween.

Regarding a TFT array panel 100, a plurality of gate lines 121 including a plurality of gate electrodes 124 and a plurality of storage electrode lines 131 including a plurality of storage electrodes 133 are formed on a substrate 110, and a gate insulating layer 140, a plurality of semiconductor stripes 151 including a plurality of projections 154, and a plurality of ohmic contact stripes 161 including a plurality of projections 163 and a plurality of ohmic contact islands 165 are sequentially formed thereon. A plurality of data lines 171 including a plurality of source electrodes 173 and a plurality of drain electrodes 175 are formed on the ohmic contacts 161 and 165 and the gate insulating layer 140.

A first passivation layer 801 preferably made of inorganic insulator such as SiNx is formed on the data lines 171 and the drain electrodes 175.

A plurality of red, green and blue color filters 230R, 230G and 230B is formed on the first passivation layer 801 and they are disposed substantially between the data lines 171. The color filters 230R, 230G or 230B in adjacent two data lines 171 and arranged in the longitudinal direction may be connected to each other to form a periodically-curved stripe. The neighboring color filters 230R, 230G and 230B overlap each other on the data lines 171 to form hills. The color filters 230R, 230G and 230B have a plurality of openings disposed on the drain electrodes 175 and are not provided on a peripheral area which is provided with the expansions 129 and 179 of the gate lines 121 and the data lines 179.

A second passivation layer 802 preferably made of photosensitive organic material is formed on the color filters 230R, 230G and 230B. The second passivation layer 802 also forms hills when running over the hills formed by the color filters 230R, 230G and 230B and the hills of the second passivation layer 802 enhance the control of the tilt directions of LC molecules in the LC layer 3. The second passivation layer 802 prevents the color filters 230R, 230G and 230B from contaminating the pixel electrodes 190 and it may be made of inorganic insulator such as SiNx and $SiO_2$.

The passivation layers 801 and 802 have a plurality of contact holes 181b and 183b, and the passivation layers 801 and 802 and the gate insulating layer 140 have a plurality of contact holes 182b. The openings of the color filters 230R, 230G and 230B expose the contact holes 181b and a top surface of the first passivation layer 801.

A plurality of protrusions 280 are formed on the second passivation layer 802.

A plurality of pixel electrodes 190 and a plurality of contact assistants 81 and 82 are formed on the second passivation layer 802 and an alignment layer 11 is formed thereon.

The common electrode panel 200 includes a light blocking member 220, a common electrode 270, and an alignment layer 21 formed on an insulating substrate 210. Comparing the common electrode panel 200 shown in FIGS. 2, 4 and 5, the common electrode panel 200 shown in FIGS. 16-18 has no color filter and no overcoat.

Since the color filters 230R, 230G and 230B and the pixel electrodes 190 are provided on the TFT array panel 100, the LCD shown in FIGS. 16-18 may have a large alignment margin for aligning the TFT array panel 100 and the common electrode panel 200.

A TFT array panel 100 shown in FIGS. 16-18 may be manufactured by depositing a first passivation layer 801, forming a plurality of red, green, and blue color filters 230R, 230G, and 230B, coating a second passivation layer 802 made of a photosensitive organic layer, exposing and developing the passivation layer 802 to form upper portions of a plurality of contact holes 181b, 182b and 183b, forming a plurality of protrusions 280, removing exposed portions of the first passivation layer 801 and the gate insulating layer 140 to form lower portions of the contact holes 181b, 182b and 183b, forming a plurality of pixel electrodes 190 and a plurality of contact assistants 81 and 82, and coating an alignment layer 11, after forming the gate lines 121, the storage electrode lines 131, the gate insulating layer 140, the semiconductor stripes 151, the ohmic contacts 161 and 165, the data lines 171, and the drain electrodes 175 as described above with reference to FIGS. 6A-7B. The formation of the color filters 230R, 230G, and 230B includes thrice repetitions of coating, exposing, and developing a photosensitive film including a colored pigment.

Many of the above-described features of the LCD shown in FIGS. 1-5 may be appropriate to the LCD shown in FIGS. 16-18.

An LCD according to another embodiment of the present invention will be described in detail with reference to FIGS. 19-21.

Figure 19:
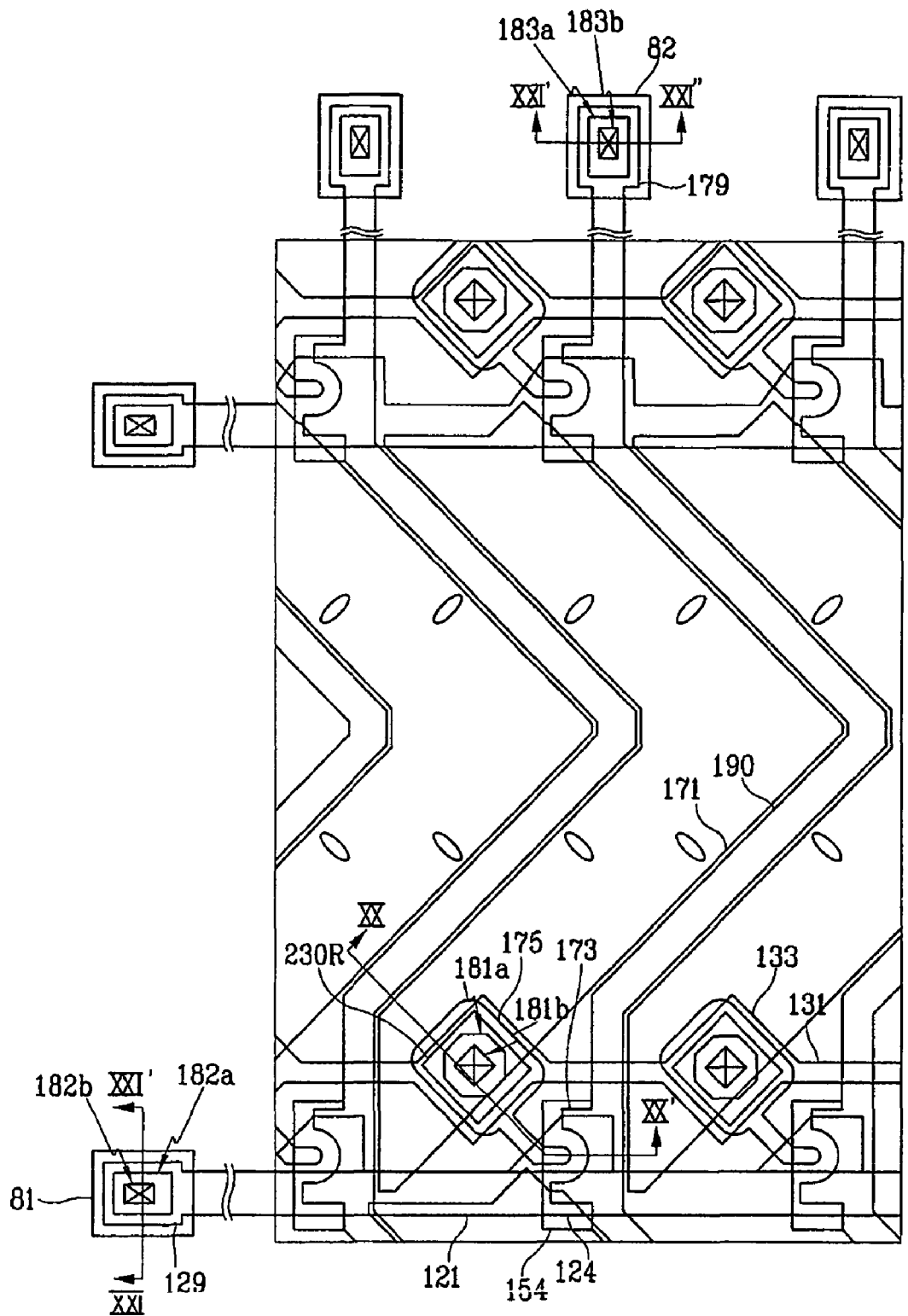
FIG. 19 is a layout view of an LCD according to another embodiment of the present invention.
Figure 20:
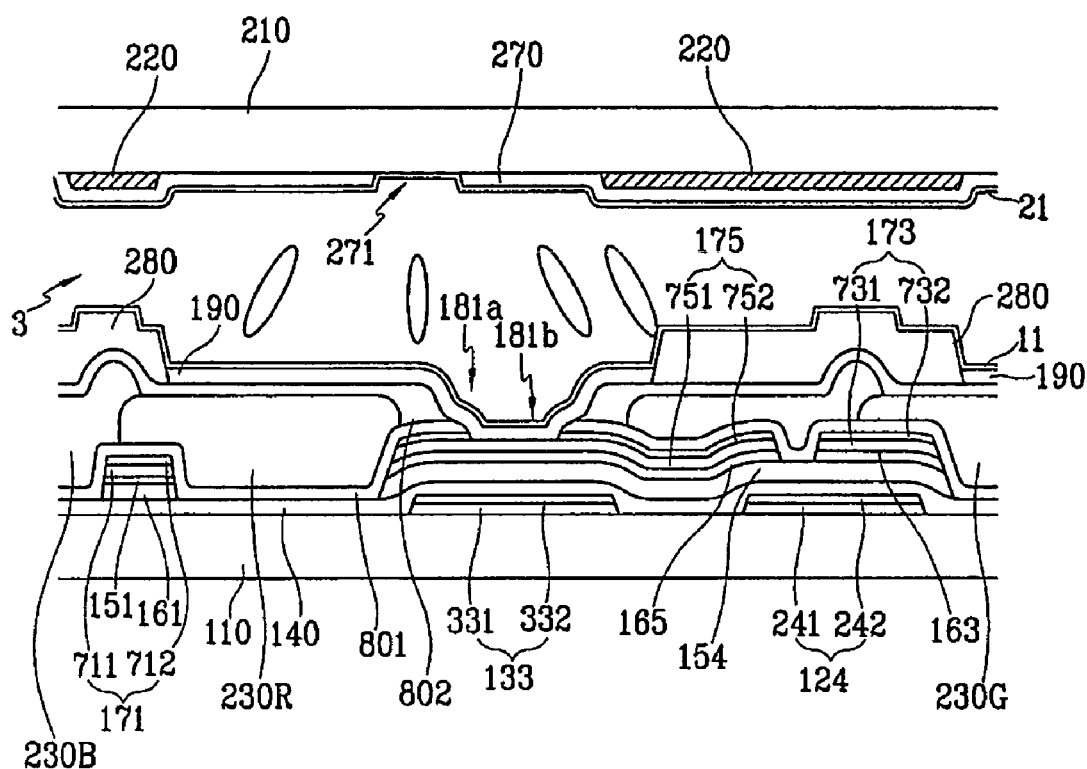
FIG. 20 is a sectional view of the LCD shown in FIG. 19 taken along the line XX-XX'.
Figure 21:
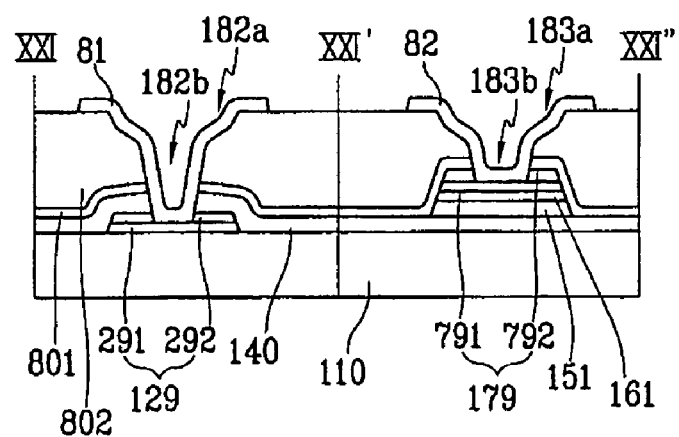
FIG. 21 is a sectional view of the LCD shown in FIG. 19 taken along the lines XXI-XXI' and XXI'-XXI"

FIG. 19 is a layout view of an LCD according to another embodiment of the present invention, FIG. 20 is a sectional view of the LCD shown in FIG. 19 taken along the line XX-XX', and FIG. 21 is a sectional view of the LCD shown in FIG. 19 taken along the lines XXI-XXI' and XXI'-XXI".

Referring to FIGS. 19-21, an LCD according to this embodiment also includes a TFT array panel 100, a common electrode panel 200, and a LC layer 3 interposed therebetween.

Layered structures of the panels 100 and 200according to this embodiment are almost the same as those shown in FIGS. 16-18.

Concerning the TFT array panel 100, a plurality of gate lines 121 and a plurality of storage electrode lines 131 are formed on a substrate 110, and a gate insulating layer 140, a plurality of semiconductor stripes 151 including a plurality of projections 154, and a plurality of ohmic contact stripes 161 including a plurality of projections 163 and a plurality of ohmic contact islands 165 are sequentially formed thereon. A plurality of data lines 171 and a plurality of drain electrodes 175 are formed on the ohmic contacts 161 and 165, and a first passivation layer 801 is formed thereon. A plurality of red, green and blue color filters 230R, 230G and 230B are formed on the first passivation layer 801 and a second passivation layer 802 is formed thereon. A plurality of contact holes 181b, 182b and 183b are provided at the first and the second passivation layers 801 and 802 and the gate insulating layer 140, and a plurality of protrusions 280 are formed on the second passivation layer 802. A plurality of pixel electrodes 190 and a plurality of contact assistants 81 and 82 are formed on the second passivation layer 802 and an alignment layer 11 is formed thereon.

Concerning the common electrode panel 200, a light blocking member 220, a common electrode 270, and an alignment layer 21 are sequentially formed on an insulating substrate 210.

Different from the LCD shown in FIGS. 16-18, the semiconductor stripes 151 have almost the same planar shapes as the data lines 171 and the drain electrodes 175 as well as the underlying ohmic contacts 161 and 165. However, the projections 154 of the semiconductor stripes 151 include some exposed portions, which are not covered with the data lines 171 and the drain electrodes 175 such as portions located between the source electrodes 173 and the drain electrodes 175.

A TFT array panel 100 shown in FIGS. 19-21 may be manufactured by forming a first passivation layer 801, a plurality of red, green, and blue color filters 230R, 230G, and 230B, a second passivation layer 802, a plurality of protrusions 280, a plurality of pixel electrodes 190, a plurality of contact assistants 81 and 82, and an alignment layer 11 based on the steps described with reference to FIGS. 16-18, after forming the gate lines 121, the storage electrode lines 131, the gate insulating layer 140, the semiconductor stripes 151, the ohmic contacts 161 and 165, the data lines 171, and the drain electrodes 175 based on the steps described with reference to FIGS. 12A-13B.

Many of the above-described features of the LCD shown in FIGS. 16-18 may cover the LCD shown in FIGS. 19-21.

An LCD according to another embodiment of the present invention will be described in detail with reference to FIGS. 22 and 23.

Figure 22:
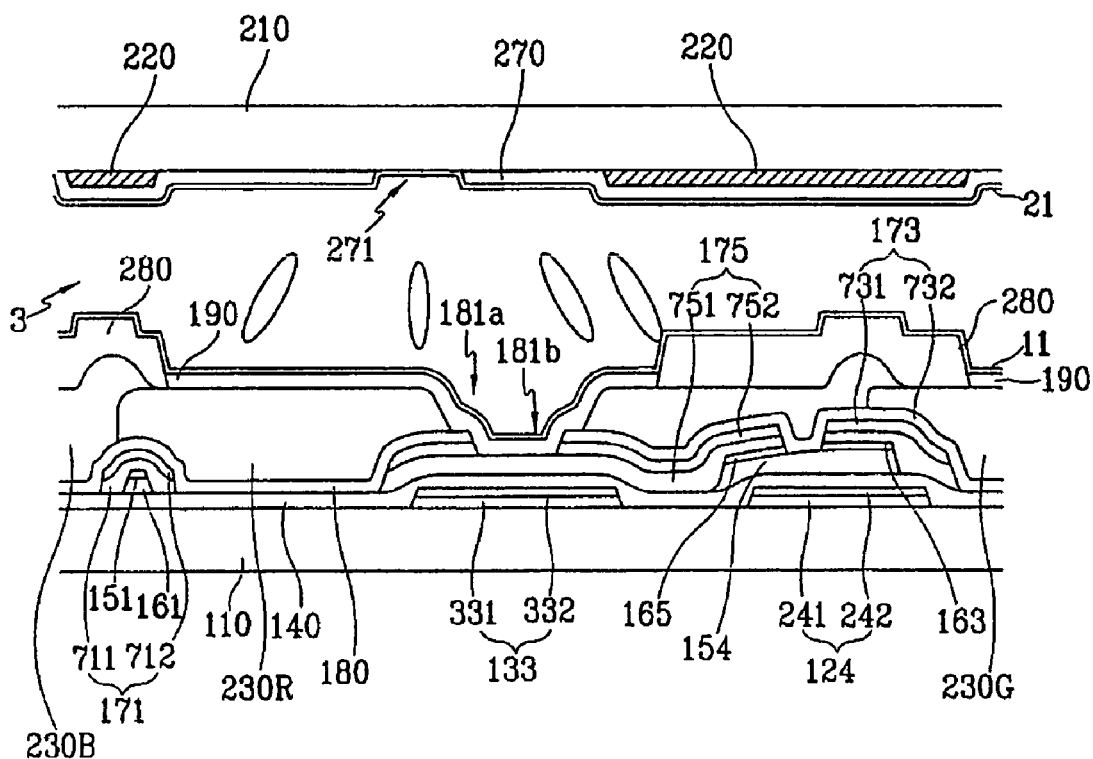
FIGS. 22 and 23 are sectional views of an, LCD according to another embodiment of the present invention.
Figure 23:
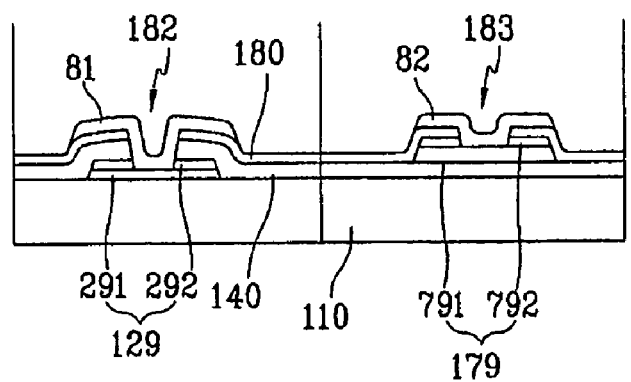

FIGS. 22 and 23 are sectional views of an LCD according to another embodiment of the present invention, which have a similar layout as the LCD shown in FIG. 16.

Referring to FIGS. 22 and 23, an LCD according to this embodiment also includes a TFT array panel 100, a common electrode panel 200, and a LC layer 3 interposed therebetween.

Layered structures of the panels 100 and 200 according to this embodiment are almost the same as those shown in FIGS. 17 and 18.

Concerning the TFT array panel 100, a plurality of gate lines 121 and a plurality of storage electrode lines 131 are formed on a substrate 110, and a gate insulating layer 140, a plurality of semiconductor stripes 151 including a plurality of projections 154, and a plurality of ohmic contact stripes 161 including a plurality of projections 163 and a plurality of ohmic contact islands 165 are sequentially formed thereon. A plurality of data lines 171 and a plurality of drain electrodes 175 are formed on the ohmic contacts 161 and 165, and a passivation layer 180 is formed thereon. A plurality of red, green and blue color filters 230R, 230G, and 230B are formed on the passivation layer 180, and a plurality of protrusions 280 are formed on the passivation layer 180. A plurality of pixel electrodes 190 and a plurality of contact assistants 81 and 82 are formed on the passivation layer 180 and an alignment layer 11 is formed thereon. A plurality of contact holes 181b, 182b and 183b are provided at the passivation layer 180 and the gate insulating layer 140.

Concerning the common electrode panel 200, a light blocking member 220, a common electrode 270, and an alignment layer 21 are sequentially formed on an insulating substrate 210.

Different from the LCD shown in FIGS. 16-18, there is no additional passivation layer on the color filters 230R, 230G, and 230B. Accordingly, lateral surfaces of openings of the color filters 230R, 230G, and 230B exposing the contact holes 181b serve as upper portions of sidewalls 181a of the contact holes 181b to smooth the profiles thereof as shown in FIG. 22. This structure is preferable when the color filters 230R, 230G and 230B do not discharge impurities such as pigment.

Many of the above-described features of the LCD shown in FIGS. 16-18 may cover the LCD shown in FIGS. 22 and 23.

An LCD according to another embodiment of the present invention will be described in detail with reference to FIGS. 24 and 25.

Figure 24:
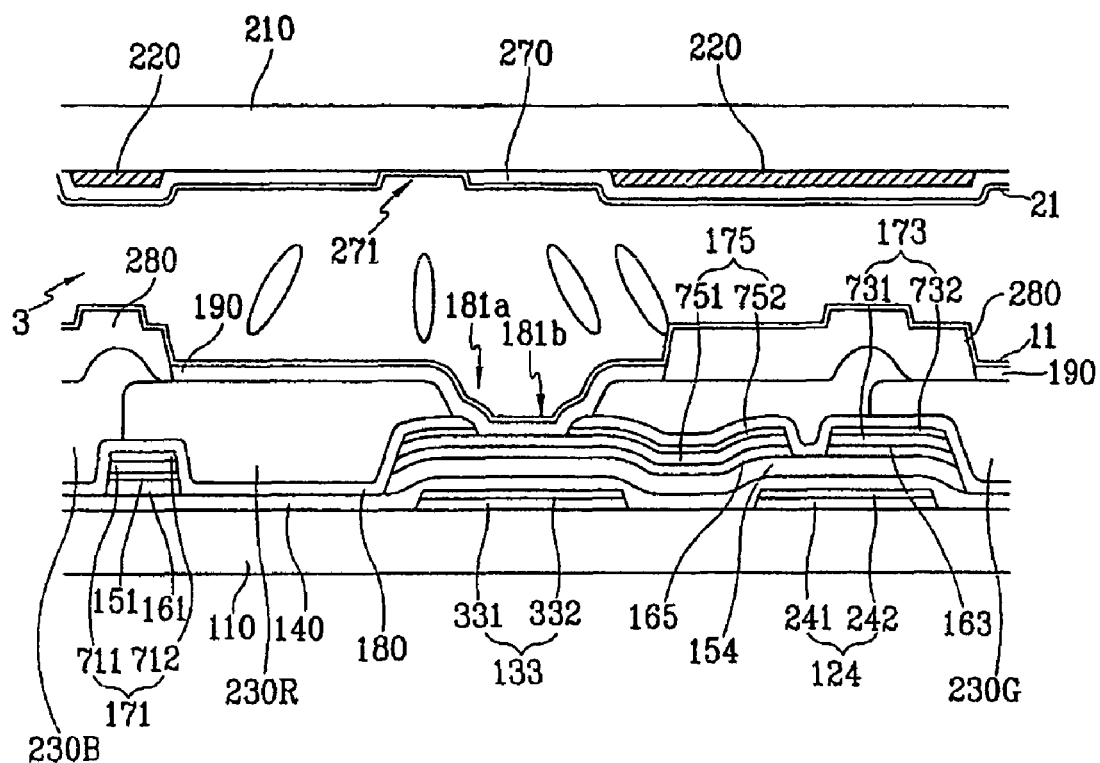
FIGS. 24 and 25 are sectional views of an LCD according to another embodiment of the present invention.
Figure 25:
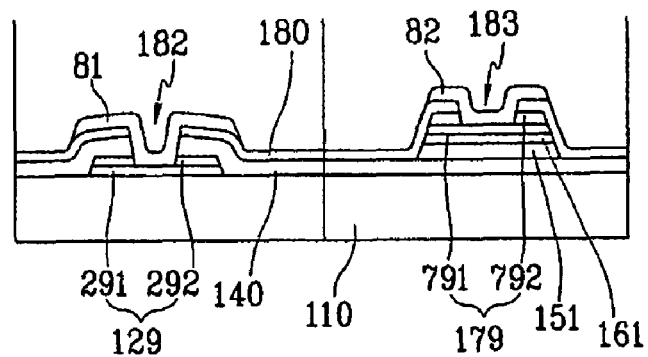

FIGS. 24 and 25 are sectional views of an LCD according to another embodiment of the present invention, which have a similar layout as the LCD shown in FIG. 19.

Referring to FIGS. 24 and 25, an LCD according to this embodiment also includes a TFT array panel 100, a common electrode panel 200, and a LC layer 3 interposed therebetween.

Layered structures of the panels 100 and 200 according to this embodiment are almost the same as those shown in FIGS. 22 and 23.

Concerning the TFT array panel 100, a plurality of gate lines 121 and a plurality of storage electrode lines 131 are formed on a substrate 110, and a gate insulating layer 140, a plurality of semiconductor stripes 151 including a plurality of projections 154, and a plurality of ohmic contact stripes 161 including a plurality of projections 163 and a plurality of ohmic contact islands 165 are sequentially formed thereon. A plurality of data lines 171 and a plurality of drain electrodes 175 are formed on the ohmic contacts 161 and 165, and a passivation layer 180 is formed thereon. A plurality of red, green and blue color filters 230R, 230G and 230B are formed on the passivation layer 180 and a plurality of protrusions 280 are formed on the color filters 230R, 230G and 230B. A plurality of contact holes 181b, 182b and 183b are provided at the passivation layer 180 and the gate insulating layer 140, and a plurality of pixel electrodes 190 and a plurality of contact assistants 81 and 82 are formed on the passivation layer 180. An alignment layer 11 is formed thereon.

Concerning the common electrode panel 200, a light blocking member 220, a common electrode 270, and an alignment layer 21 are sequentially formed on an insulating substrate 210.

Different from the LCD shown in FIGS. 22 and 23, the semiconductor stripes 151 have almost the same planar shapes as the data lines 171 and the drain electrodes 175 as well as the underlying ohmic contacts 161 and 165. However, the projections 154 of the semiconductor stripes 151 include some exposed portions, which are not covered with the data lines 171 and the drain electrodes 175 such as portions located between the source electrodes 173 and the drain electrodes 175.

Many of the above-described features of the LCD shown in FIGS. 22 and 23 may cover the LCD shown in FIGS. 24 and 25.

An LCD according to another embodiment of the present invention will be described in detail with reference to FIGS. 26 and 27.

Figure 26:
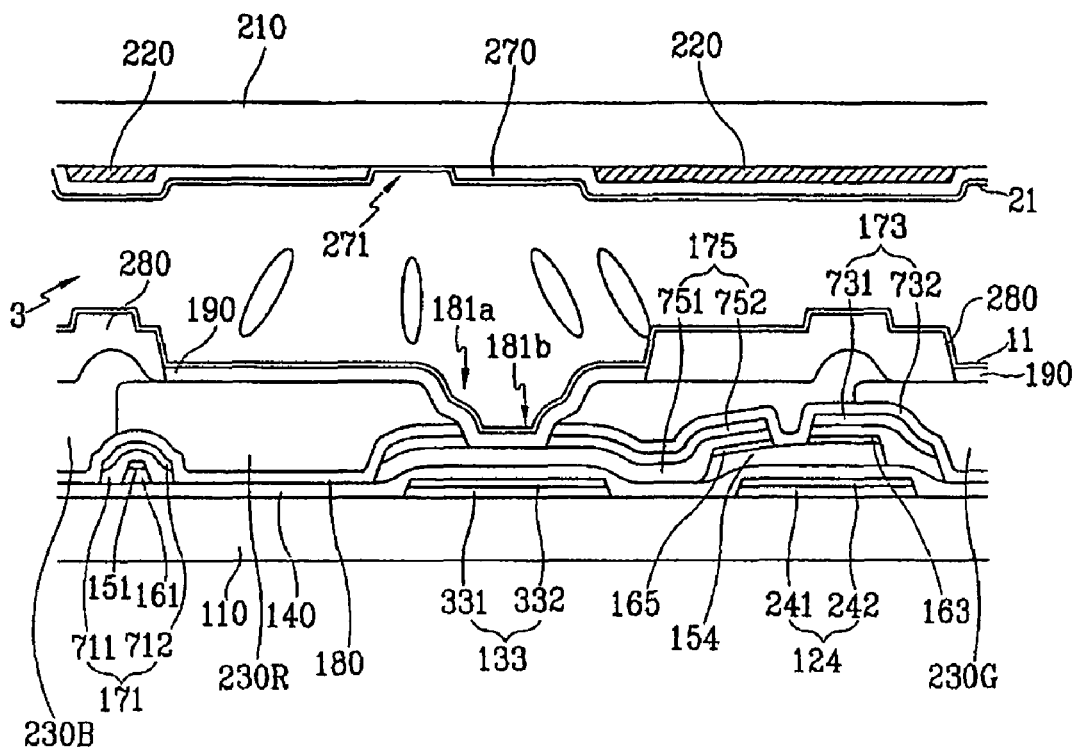
FIGS. 26 and 27 are sectional views of an LCD according to another embodiment of the present invention.
Figure 27:
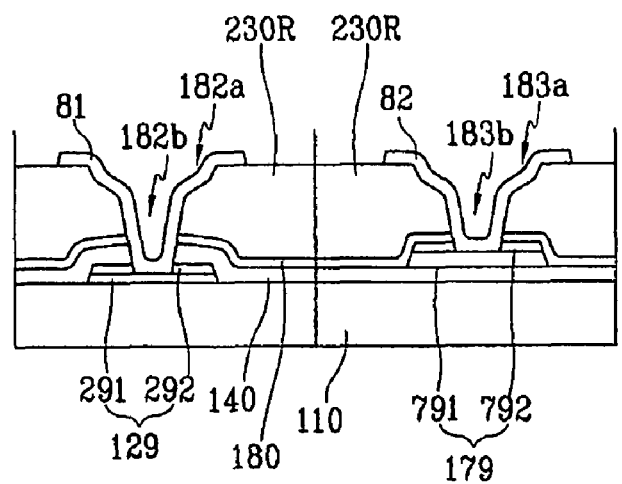

FIGS. 26 and 27 are sectional views of an LCD according to another embodiment of the present invention, which have a similar layout as the LCD shown in FIG. 16.

Referring to FIGS. 26 and 27, an LCD according to this embodiment also includes a TFT array panel 100, a common electrode panel 200, and a LC layer 3 interposed therebetween.

Layered structures of the panels 100 and 200 according to this embodiment are almost the same as those shown in FIGS. 22 and 23.

Concerning the TFT array panel 100, a plurality of gate lines 121 and a plurality of storage electrode lines 131 are formed on a substrate 110, and a gate insulating layer 140, a plurality of semiconductor stripes 151 including a plurality of projections 154, and a plurality of ohmic contact stripes 161 including a plurality of projections 163 and a plurality of ohmic contact islands 165 are sequentially formed thereon. A plurality of data lines 171 and a plurality of drain electrodes 175 are formed on the ohmic contacts 161 and 165, and a passivation layer 180 is formed thereon. A plurality of red, green and blue color filters 230R, 230G, and 230B are formed on the passivation layer 180 and a plurality of protrusions 280 are formed on the passivation layer 180. A plurality of pixel electrodes 190 and a plurality of contact assistants 81 and 82 are formed on the passivation layer 180 and an alignment layer 11 is formed thereon. A plurality of contact holes 181b, 182b and 183b are provided at the passivation layer 180 and the gate insulating layer 140.

Concerning the common electrode panel 200, a light blocking member 220, a common electrode 270, and an alignment layer 21 are sequentially formed on an insulating substrate 210.

Different from the LCD shown in FIGS. 22 and 23, the color filters 230R, 230G or 230B are also disposed on a peripheral area which is provided with expansions 129 and 179 of the gate lines 121 and the data lines 179. Although FIG. 27 shows that a red color filter 230R is disposed on the peripheral area, any one or more of the red, green and blue color filters 230R, 230G and 230B may be provided on the peripheral area. In addition, the color filters 230R, 230G, and 230B have a plurality of openings forming upper portions of sidewalls 181a, 182a and 183a of the contact holes 181b, 182b and 183b. Accordingly, lateral surfaces of the openings of the color filters 230R, 230G, and 230B are smoothly connected to the lateral surfaces of the contact holes 181b, 182b and 183b at the passivation layer 180.

A TFT array panel 100 shown in FIGS. 24 and 25 may be manufactured by depositing a passivation layer 180, forming a plurality of red, green, and blue color filters 230R, 230G, and 230B having openings forming upper portions of a plurality of contact holes 181b, 182b and 183b exposing portions of the passivation layer 180, forming a plurality of protrusions 280, removing exposed portions of the passivation layer 180 and the gate insulating layer 140 to form lower portions of the contact holes 181b, 182b and 183b, forming a plurality of pixel electrodes 190 and a plurality of contact assistants 81 and 82, and coating an alignment layer 11, after forming the gate lines 121, the storage electrode lines 131, the gate insulating layer 140, the semiconductor stripes 151, the ohmic contacts 161 and 165, the data lines 171, and the drain electrodes 175 as described above with reference to FIGS. 6A-7B.

Many of the above-described features of the LCD shown in FIGS. 22 and 23 may cover the LCD shown in FIGS. 26 and 27.

An LCD according to another embodiment of the present invention will be described in detail with reference to FIGS. 28 and 29.

Figure 28:
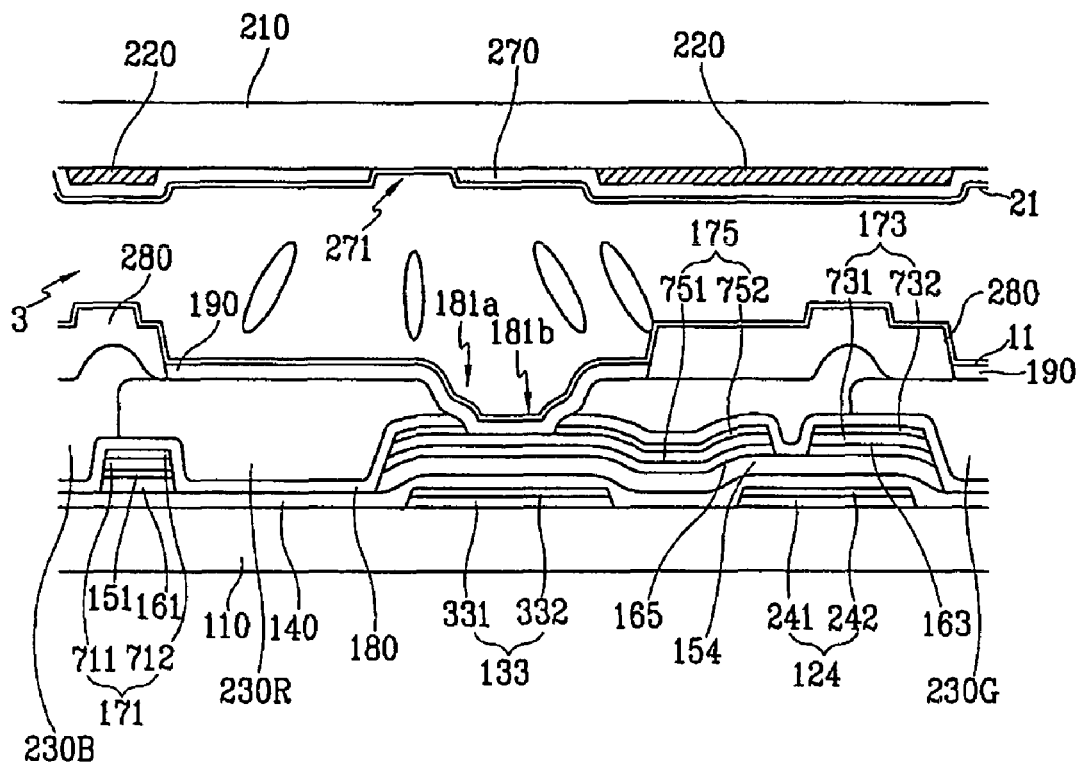
FIGS. 28 and 29 are sectional views of an LCD according to another embodiment of the present invention.
Figure 29:
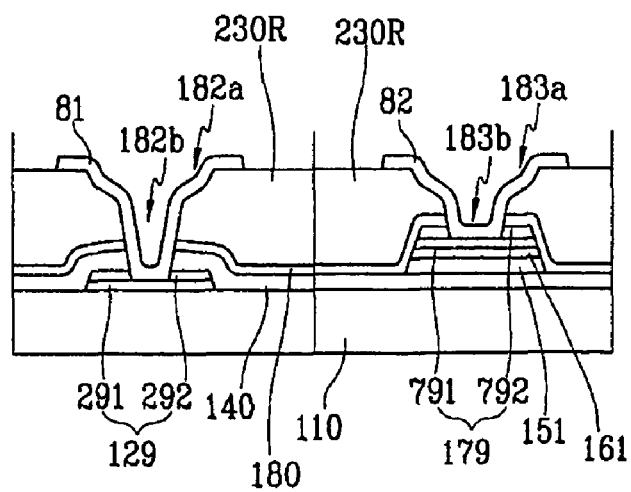

FIGS. 28 and 29 are sectional views of an LCD according to another embodiment of the present invention, which have a similar layout as the LCD shown in FIG. 19.

Referring to FIGS. 28 and 29, an LCD according to this embodiment also includes a TFT array panel 100, a common electrode panel 200, and a LC layer 3 interposed therebetween.

Layered structures of the panels 100 and 200 according to this embodiment are almost the sane as those shown in FIGS. 26 and 27.

Concerning the TFT array panel 100, a plurality of gate lines 121 and a plurality of storage electrode lines 131 are formed on a substrate 110, and a gate insulating layer 140, a plurality of semiconductor stripes 151 including a plurality of projections 154, and a plurality of ohmic contact stripes 161 including a plurality of projections 163 and a plurality of ohmic contact islands 165 are sequentially formed thereon. A plurality of data lines 171 and a plurality of drain electrodes 175 are formed on the ohmic contacts 161 and 165, and a passivation layer 180 is formed thereon. A plurality of red, green and blue color filters 230R, 230G and 230B are formed on the passivation layer 180 and a plurality of protrusions 280 are formed on the passivation layer 180. A plurality of contact holes 181b, 182b and 183b are provided at the color filters 230R, 230G, and 230B, the passivation layer 180 and the gate insulating layer 140, and a plurality of pixel electrodes 190 and a plurality of contact assistants 81 and 82 are formed on the passivation layer 180. An alignment layer 11 is formed thereon.

Concerning the common electrode panel 200, a light blocking member 220, a common electrode 270, and an alignment layer 21 are sequentially formed on an insulating substrate 210.

Different from the LCD shown in FIGS. 26 and 27, the semiconductor stripes 151 have almost the same planar shapes as the data lines 171 and the drain electrodes 175 as well as the underlying ohmic contacts 161 and 165. However, the projections 154 of the semiconductor stripes 151 include some exposed portions, which are not covered with the data lines 171 and the drain electrodes 175 such as portions located between the source electrodes 173 and the drain electrodes 175.

Many of the above-described features of the LCD shown in FIGS. 26 and 27 may cover the LCD shown in FIGS. 28 and 29.

An LCD according to another embodiment of the present invention will be described in detail with reference to FIG. 30.

Figure 30:
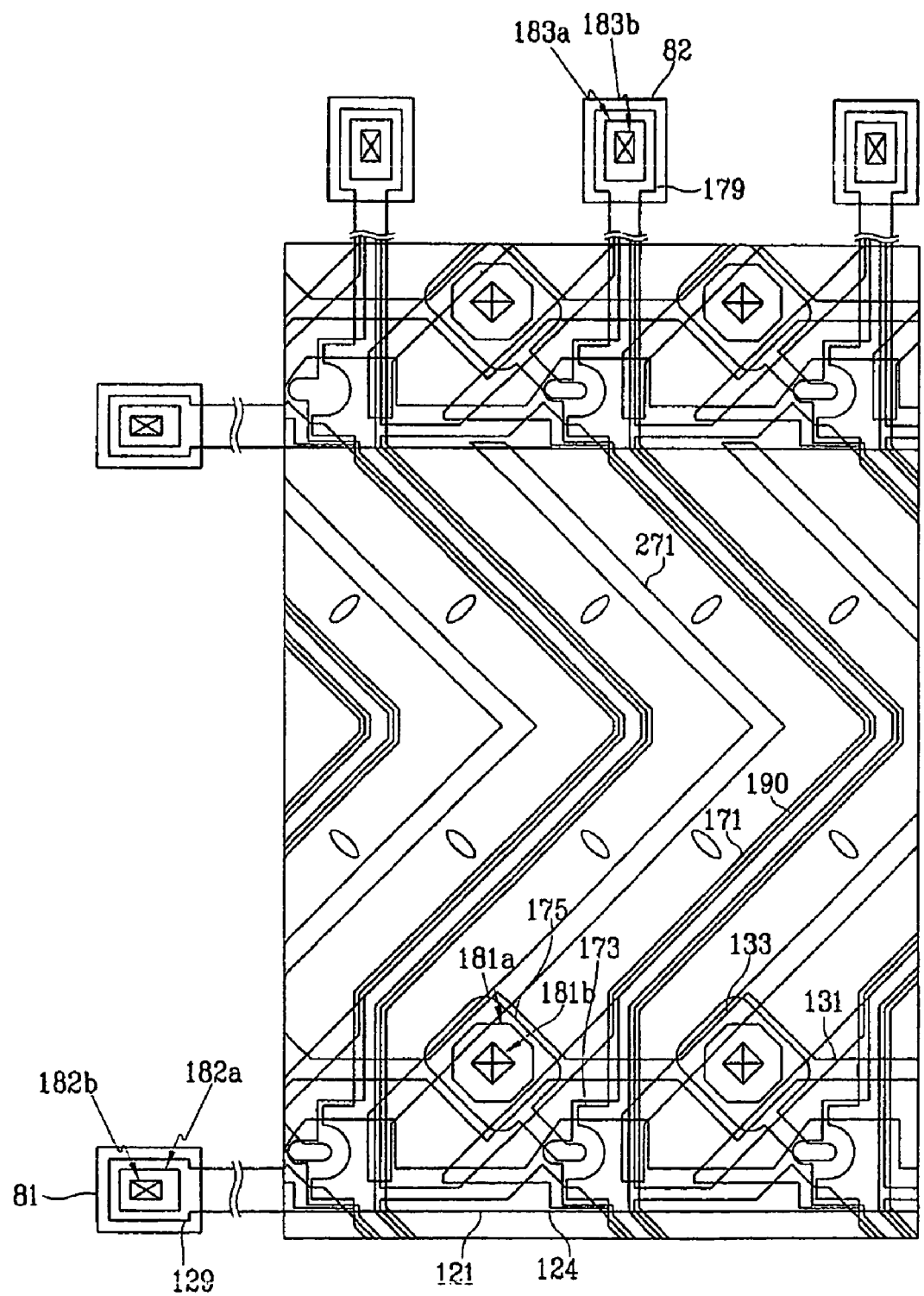
FIG. 30 is a layout view of an LCD according to another embodiment of the present invention.

FIG. 30 is a layout view of an LCD according to another embodiment of the present invention.

The structure of the LCD according to this embodiment is almost the same as that shown in FIGS. 1-5. Referring to FIG. 30 as well as FIGS. 4 and 5, an LCD according to this embodiment also includes a TFT array panel 100, a common electrode panel 200, and a LC layer 3 interposed therebetween.

Regarding the TFT array panel 100, a plurality of gate lines 121 including a plurality of gate electrodes 124 and a plurality of storage electrode lines 131 including a plurality of storage electrodes 133 are formed on a substrate 110, and a gate insulating layer 140, a plurality of semiconductor stripes 151 including a plurality of projections 154, and a plurality of ohmic contact stripes 161 including a plurality of projections 163 and a plurality of ohmic contact islands 165 are sequentially formed thereon. A plurality of data lines 171 including a plurality of source electrodes 173 and a plurality of drain electrodes 175 are formed on the ohmic contacts 161 and 165, and a passivation layer 180 is formed thereon. A plurality of contact holes 181b, 182b and 183b are provided at the passivation layer 180 and the gate insulating layer 140, and a plurality of protrusions 280 are formed on the passivation layer 180. A plurality of pixel electrodes 190 and a plurality of contact assistants 81 and 82 are formed on the passivation layer 180, and an alignment layer 11 is formed thereon.

Regarding the common electrode panel 200, a light blocking member 220, a plurality of color filters 230, an overcoat 250, a common electrode 270 having a plurality cutouts 217, and an alignment layer 21 are formed on an insulating substrate 210. Each cutout 271 includes a pair of oblique portions connected to each other and a longitudinal portion connected to one of the oblique portions.

Different from the LCD shown in FIG. 3, the cutouts 271 of the common electrode 270 have no transverse portion.

Many of the above-described features of the LCD shown in FIGS. 1-5 may be appropriate to the LCD shown in FIG. 30.

An LCD according to another embodiment of the present invention will be described in detail with reference to FIG. 31.

Figure 31:
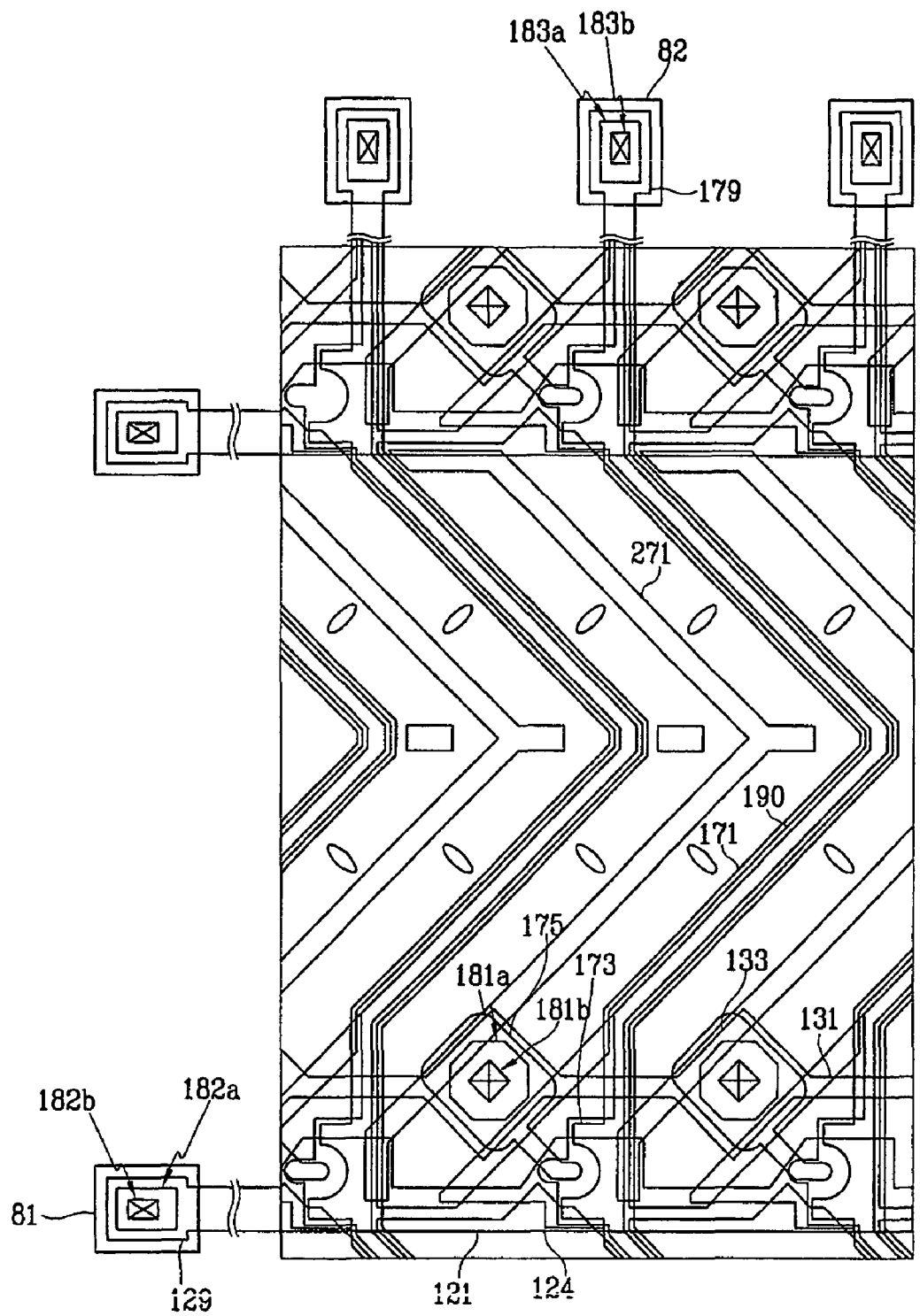
FIG. 31 is a layout view of an LCD according to another embodiment of the present invention.

FIG. 31 is a layout view of an LCD according to another embodiment of the present invention.

The structure of the LCD according to this embodiment is almost the same as that shown in FIGS. 1-5. Referring to FIG. 31 as well as FIGS. 4 and 5, an LCD according to this embodiment also includes a TFT array panel 100, a common electrode panel 200, and a LC layer 3 interposed therebetween.

Regarding the TFT array panel 100, a plurality of gate lines 121 including a plurality of gate electrodes 124 and a plurality of storage electrode lines 131 including a plurality of storage electrodes 133 are formed on a substrate 110, and a gate insulating layer 140, a plurality of semiconductor stripes 151 including a plurality of projections 154, and a plurality of ohmic contact stripes 161 including a plurality of projections 163 and a plurality of ohmic contact islands 165 are sequentially formed thereon. A plurality of data lines 171 including a plurality of source electrodes 173 and a plurality of drain electrodes 175 are formed on the ohmic contacts 161 and 165, and a passivation layer 180 is formed thereon. A plurality of contact holes 181b, 182b and 183b are provided at the passivation layer 180 and the gate insulating layer 140, and a plurality of protrusions 280 are formed on the passivation layer 180. A plurality of pixel electrodes 190 and a plurality of contact assistants 81 and 82 are formed on the passivation layer 180, and an alignment layer 11 is formed thereon.

Regarding the common electrode panel 200, a light blocking member 220, a plurality of color filters 230, an overcoat 250, a common electrode 270 having a plurality cutouts 217, and an alignment layer 21 are formed on an insulating substrate 210. Each cutout 271 includes a pair of oblique portions connected to each other, a transverse edge portion connected to one of the oblique portions, and a longitudinal edge portion connected to the other of the oblique portions.

Different from the LCD shown in FIG. 3, each of the cutouts 271 of the common electrode 270 has a transverse center portion connected to a meeting point of the oblique portions and making an obtuse angle with the oblique portions. In addition, each of the pixel electrodes 190 has a transverse cutout coinciding with the transverse center portion of the common electrode 270. The transverse portions of the pixel electrode 190 and the common electrode 270 assist the domain partitioning.

Many of the above-described features of the LCD shown in FIGS. 1-5 may be appropriate to the LCD shown in FIG. 31.

An LCD according to another embodiment of the present invention will be described in detail with reference to FIGS. 32-36.

Figure 32:
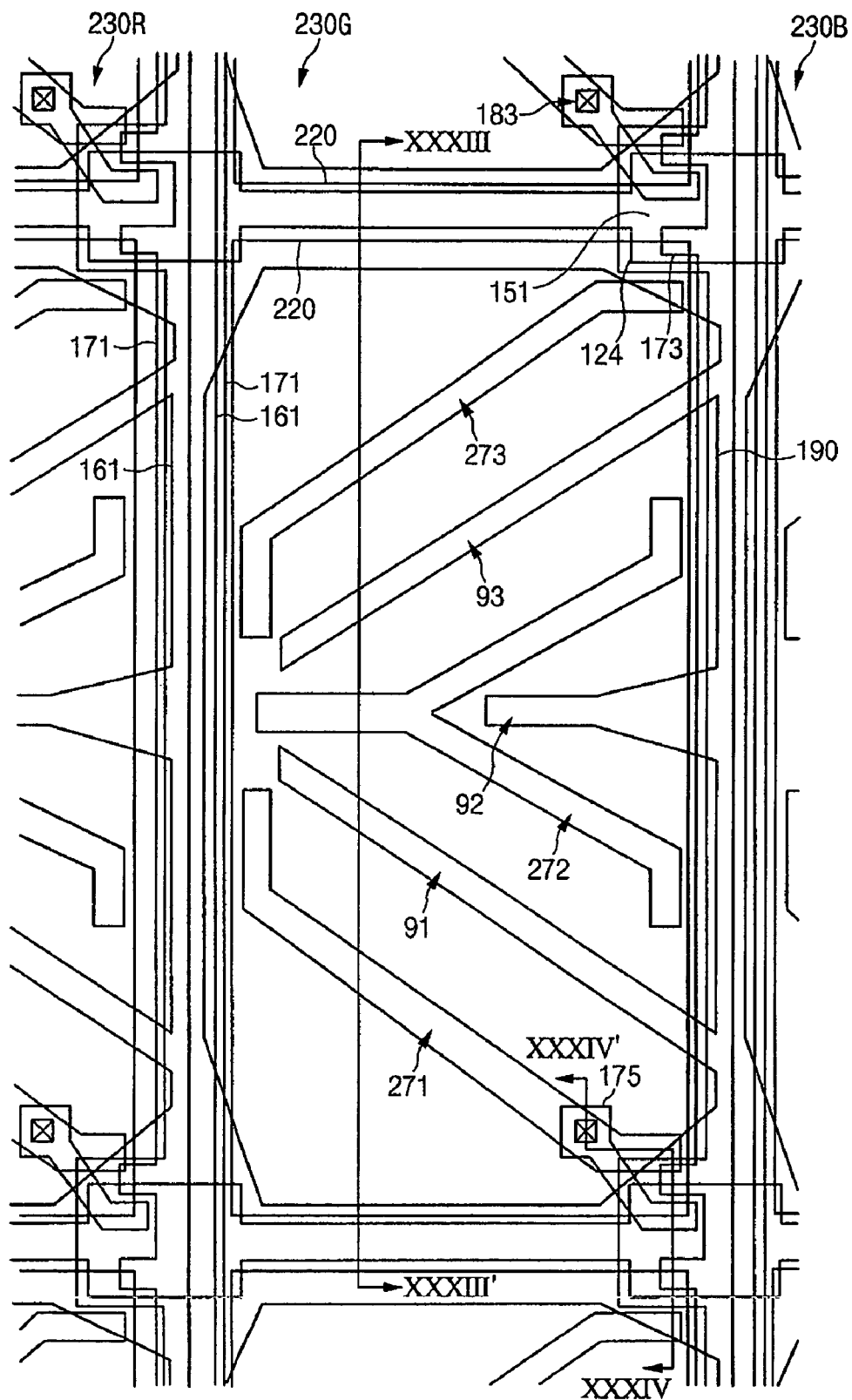
FIG. 32 is a layout view of a TFT array panel of an LCD according to another embodiment of the present invention.
Figure 33:
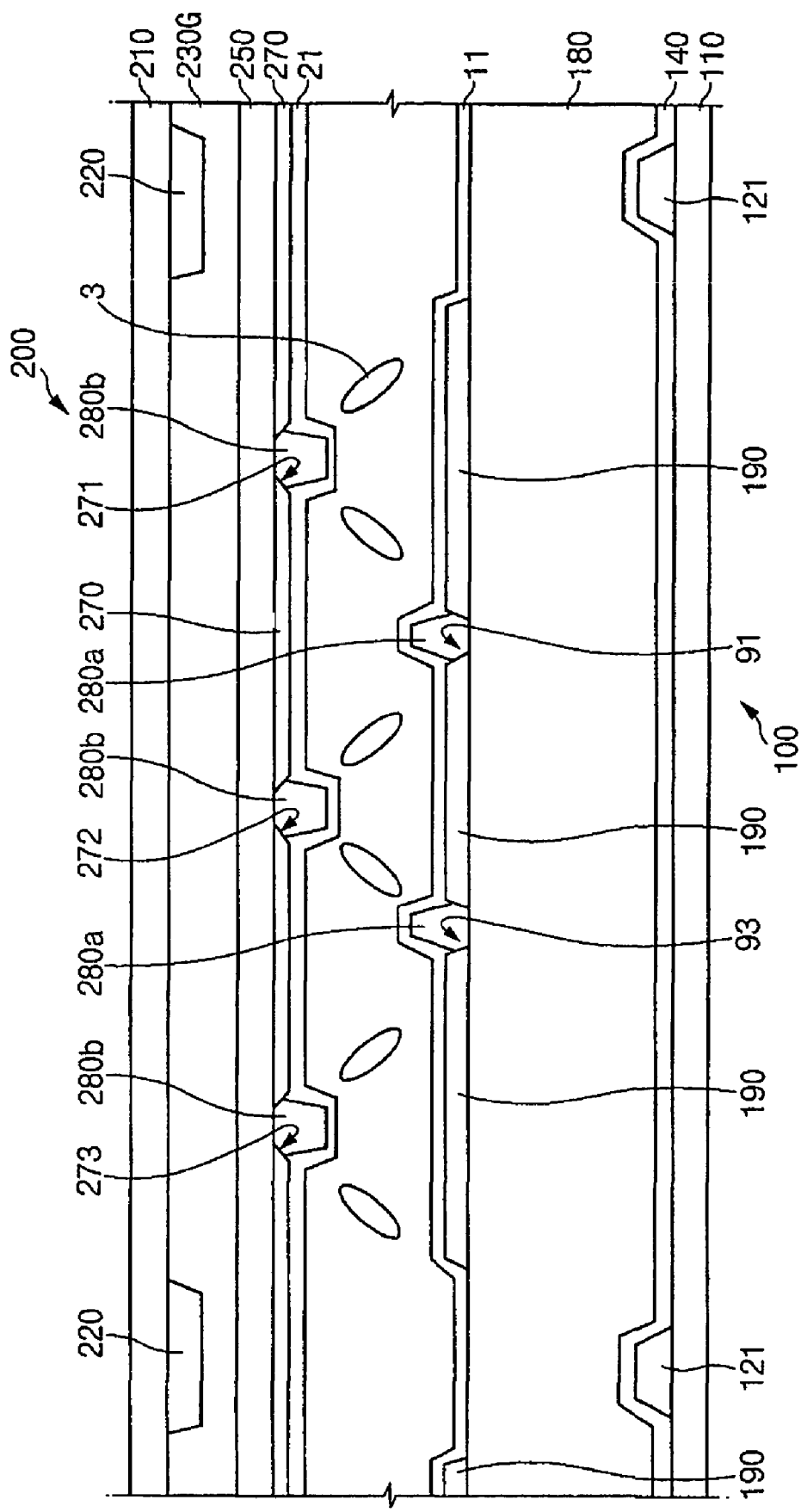
FIG. 33 is a sectional view of the LCD shown in FIG. 32 taken along the line XXXIII-XXXIII'.
Figure 34:
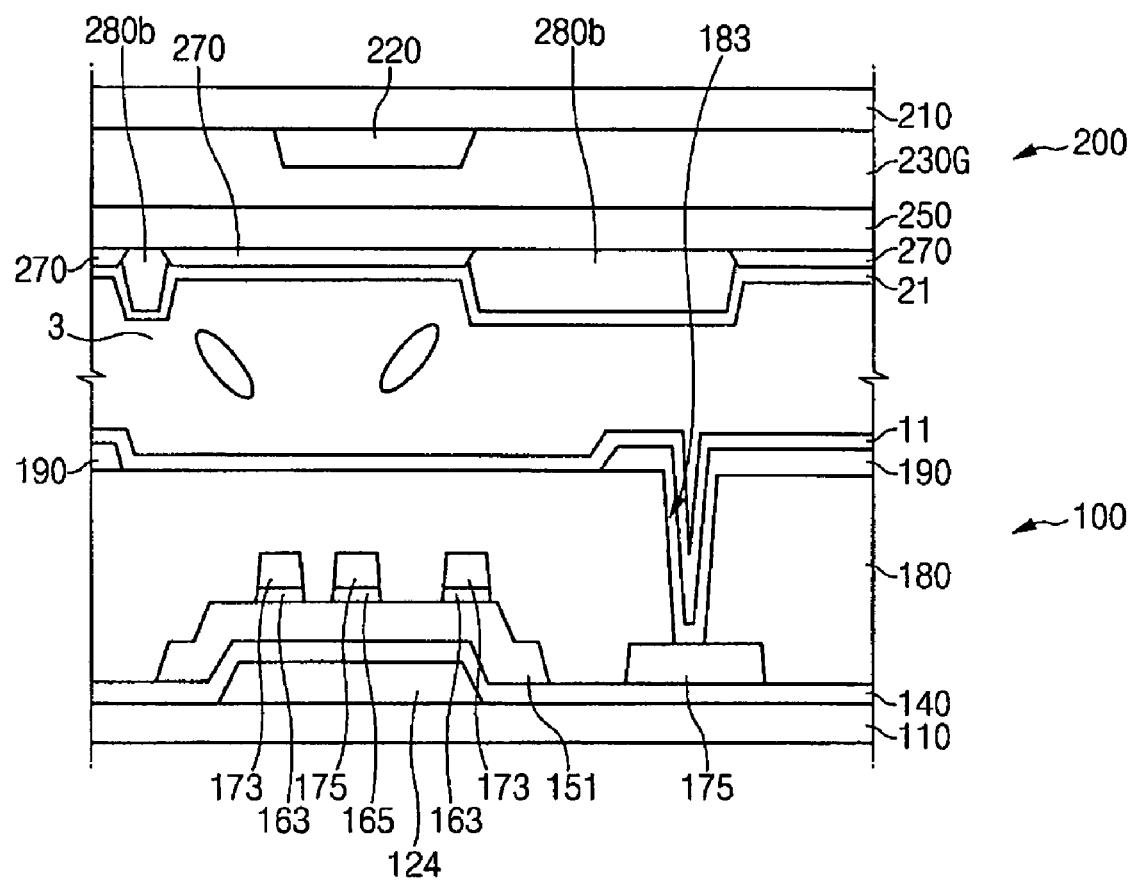
FIG. 34 is a sectional view of the LCD shown in FIG. 32 taken along the line XXXIV-XXXIV'
Figure 35:
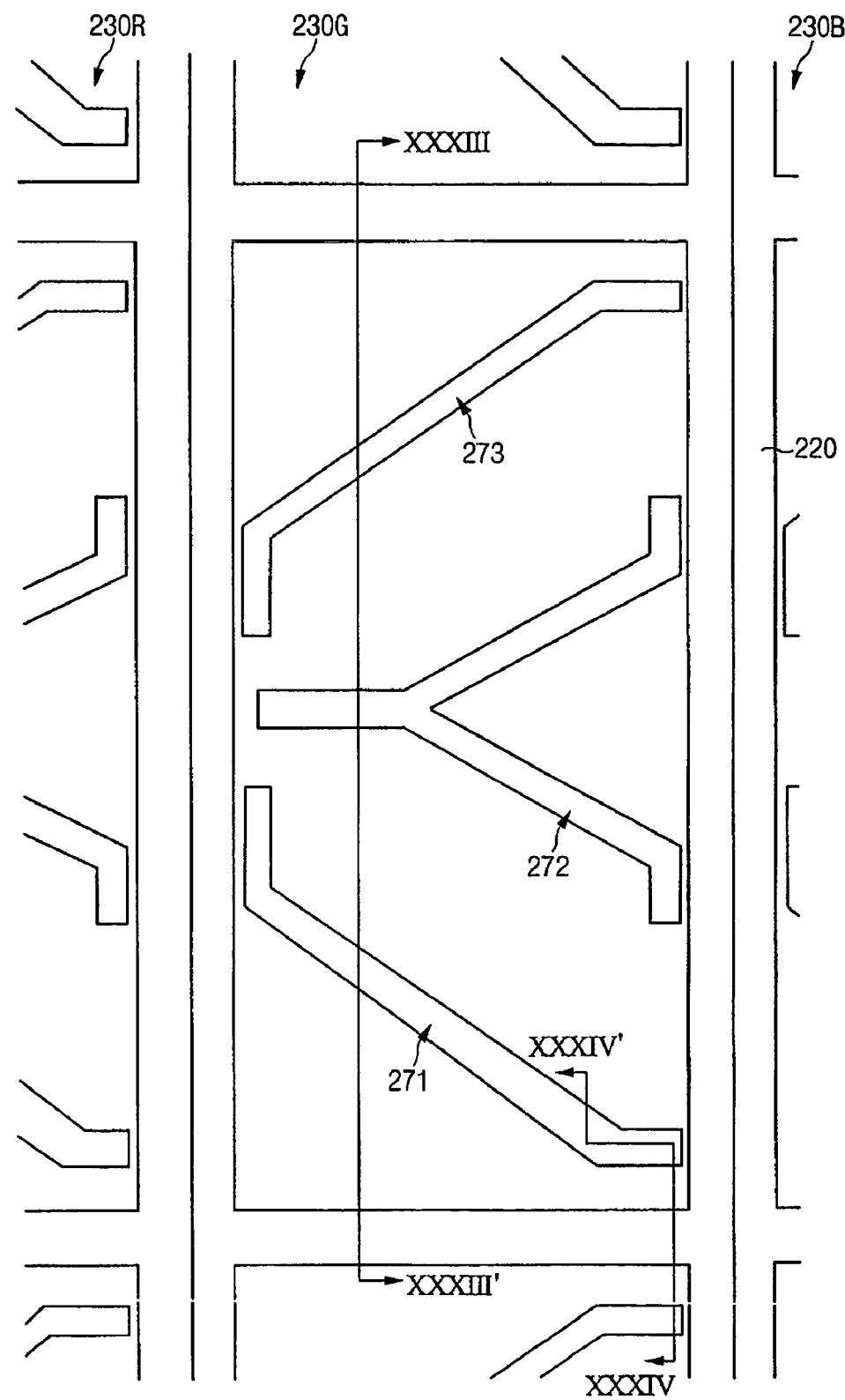
FIG. 35 is a layout view of a common electrode panel shown in FIGS. 32-34.
Figure 36:
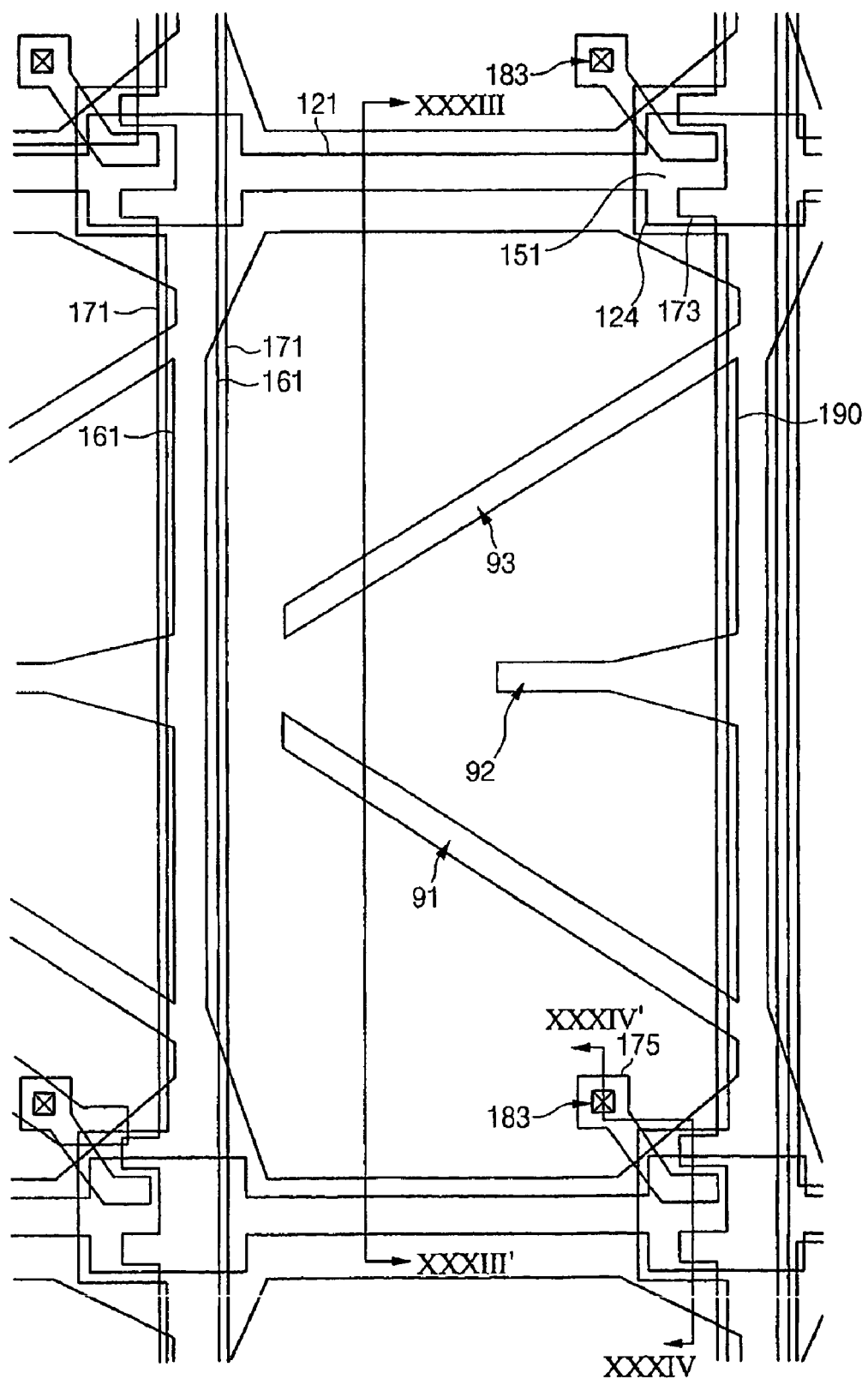
FIG. 36 is a layout view of a TFT array panel shown in FIGS. 32-34.

FIG. 32 is a layout view of a TFT array panel of an LCD according to another embodiment of the present invention, FIG. 33 is a sectional view of the LCD shown in FIG. 32 taken along the line XXXIII-XXXIII', FIG. 34 is a sectional view of the LCD shown in FIG. 32 taken along the line XXXIV-XXXIV', FIG. 35 is a layout view of a common electrode panel shown in FIGS. 32-34, and FIG. 36 is a layout view of a TFT array panel shown in FIGS. 32-34.

An LCD according to an embodiment of the present invention includes a TFT array panel 100, a common electrode panel 200, and a LC layer 3 interposed between the panels 100 and 200 and containing a plurality of LC molecules aligned vertical to surfaces of the panels 100 and 200.

The TFT array panel 100 is now described in detail.

A plurality of gate lines 121 transmitting gate signals are formed on an insulating substrate 110.

The gate lines 121 extend substantially in a transverse direction and they are separated from each other. Each gate line 121 includes a plurality of projections forming a plurality of gate electrodes 124 and an end portion having a larger width for connection with an external driving circuit.

The gate lines 121 is preferably made of Al containing metal such as Al and Al alloy, Ag containing metal such as Ag and Ag alloy, Cu containing metal such as Cu and Cu alloy, Mo containing metal such as Mo and Mo alloy, Cr, Ti or Ta. The gate lines 121 may have a multi-layered structure including two films having different physical characteristics.

In addition, the lateral sides of the gate lines 121 are inclined relative to a surface of the substrate 110, and the inclination angle thereof ranges about 20-80 degrees.

A gate insulating layer 140 preferably made of silicon nitride (SiNx) is formed on the gate lines 121.

A plurality of semiconductor stripes 151 preferably made of hydrogenated amorphous silicon (abbreviated to "a-Si") are formed on the gate insulating layer 140. Each semiconductor stripe 151 extends substantially in the longitudinal direction and has a plurality of projections 154 branched out toward the gate electrodes 124. The width of each semiconductor stripe 151 becomes large near the gate lines 121 such that the semiconductor stripe 151 covers large areas of the gate lines 121.

A plurality of ohmic contact stripes and islands 161 and 165 preferably made of silicide or n+ hydrogenated a-Si heavily doped with n type impurity such as phosphorous are formed on the semiconductor stripes 151. Each ohmic contact stripe 161 has a plurality of projections 163, and the projections 163 and the ohmic contact islands 165 are located in pairs on the projections 154 of the semiconductor stripes 151.

The lateral sides of the semiconductor stripes 151 and the ohmic contacts 161 and 165 are tapered, and the inclination angles thereof are preferably in a range between about 30-80 degrees.

A plurality of data lines 171 and a plurality of drain electrodes 175 separated from the data lines 171 are formed on the ohmic contacts 161 and 165 and the gate insulating layer 140.

The data lines 171 for transmitting data voltages extend substantially in the longitudinal direction and intersect the gate lines 121. Each data line 171 includes an end portion 179 having wider width for contact with another layer or an external device. A plurality of branches of each data line 171, which project toward the drain electrodes 175, form a plurality of source electrodes 173. Each drain electrode 175 obliquely extends from a position near the source electrode 173 to have an end portion having a rectangular shape. Each source electrode 173 is curved to partly enclose an end portion of the drain electrode 175. A gate electrode 124, a source electrode 173, and a drain electrode 175 along with a projection 154 of a semiconductor stripe 151 form a TFT having a channel formed in the projection 154 disposed between the source electrode 173 and the drain electrode 175.

The data lines 171 and the drain electrodes 175 are preferably made of refractory metal such as Mo containing metal, Cr or Al containing metal and they may also include a lower film (not shown) preferably made of Mo, Mo alloy or Cr and an upper film (not shown) located thereon and preferably made of Al containing metal.

Like the gate lines 121, the data lines 171 and the drain electrodes 175 have inclined lateral sides, and the inclination angles thereof range about 30-80 degrees.

The ohmic contacts 161 and 165 are interposed only between the underlying semiconductor stripes 151 and the overlying data lines 171 and the overlying drain electrodes 175 thereon and reduce the contact resistance therebetween. The semiconductor stripes 151 include a plurality of exposed portions, which are not covered with the data lines 171 and the drain electrodes 175, such as portions located between the source electrodes 173 and the drain electrodes 175. Although the semiconductor stripes 151 are narrower than the data lines 171 at most places, the width of the semiconductor stripes 151 becomes large near the gate lines 121 as described above, to smooth the profile of the surface, thereby preventing the disconnection of the data lines 171.

A passivation layer 180 is formed on the data lines 171, the drain electrodes 175, and the exposed portions of the semiconductor stripes 151. The passivation layer 180 is preferably made of photosensitive organic material having a good flatness characteristic, low dielectric insulating material having dielectric constant lower than 4.0 such as a-Si:C:O and a-Si: O:F formed by plasma enhanced chemical vapor deposition (PECVD), or inorganic material such as silicon nitride.

The passivation layer 180 has a plurality of contact holes 181 exposing the expansions of the drain electrodes 175.

A plurality of pixel electrodes 190 which are preferably made of ITO or IZO, are formed on the passivation layer 180. However, they may be made of reflective metal when the LCD is a reflective LCD.

The pixel electrodes 190 are physically and electrically connected to the drain electrodes 175 through the contact holes 181 such that the pixel electrodes 190 receive the data voltages from the drain electrodes 175.

Corners of each pixel electrode 190 are chamfered to form chamfered edges that preferably make an angle of about 45 degrees with the gate lines 121.

Each pixel electrode 190 has a transverse cutout 92 extending in the transverse direction and located at a position so as to partition the pixel electrode 190 into upper and lower halves arranged in the longitudinal direction, and a pair of oblique cutouts 91 and 93 extending in oblique directions and located respectively in the lower and the upper halves of the pixel electrodes 190. The cutouts 91-93 start from a right edge of the pixel electrode 190 and extend toward a left edge of the pixel electrode 190. The transverse cutout 92 ends near a center of the pixel electrode 190 and it has a chamfered inlet. The oblique cutouts 91 and 93 ends near the left edge of the pixel electrode 190. The extensions of the oblique cutouts 91 and 93 are preferably perpendicular to each other in order for regularly distributing the field directions of the fringe fields into four directions. The oblique cutouts 91 and 93 are arranged symmetrical with respect to the transverse cutout 92. The oblique cutouts 91 and 93 preferably make an angle of about 45 degrees to the gate lines 121.

Accordingly, the upper half of the pixel electrode 190 is partitioned into two upper partitions by the oblique cutout 93, and the lower half of the pixel electrode 190 is also partitioned into two lower partitions by the oblique cutouts 91.

Furthermore, a plurality of protrusions 280*a* are formed on the passivation layer 180 and disposed substantially in the cutouts 280*a*.

An alignment layer 11 is formed on the pixel electrodes 190 and the protrusions 280*a*.

The description of the common electrode panel 200 follows.

A black matrix 220 for preventing light leakage is formed on an insulating substrate 210 such as transparent glass.

A plurality of red, green and blue color filters 230R, 230G and 230B are formed substantially in open areas of the black matrix 220 and an overcoat 250 is formed on the color filters 230.

A common electrode 270 preferably made of transparent conductive material such as ITO and IZO is formed on the overcoat 250.

The common electrode 270 has a plurality of sets of cutouts 271-273. Two adjacent cutouts 271, 272 and 273 of the common electrode 270 interpose the oblique cutouts 91 and 93 of the pixel electrode 190.

In addition, a plurality of sets of protrusions 280*b* are formed on the overcoat 250 and disposed substantially in the cutouts 271-273.

The cutouts 271, 272 and 273 of the common electrode 270 opposite each other with respect to a boundary line between two adjacent pixel areas (i.e., a line extending along the data line) have substantially inversion symmetry with respect to the boundary line.

The cutouts 272 and 273 include oblique portions extending substantially parallel to the oblique cutouts 91 and 93 and transverse and longitudinal portions connected to ends of the oblique portions, overlapping the edges of the pixel electrodes 190, and making an obtuse angle with the oblique portions. The cutout 271 includes a pair of oblique portions meeting near the center of the pixel electrode 190, a central transverse portion extending from the meeting point to a longitudinal edge of the pixel electrode 190 with making an obtuse angle with the oblique portions, and a pair of terminal transverse portions extending from the ends of the oblique portions along the longitudinal edge of the pixel electrode 190 with making an obtuse angle with the oblique portions. The cutouts 271-273 are disposed between the cutouts 91-93 and the chamfered edges of the pixel electrode 190 and the distances between the oblique portions of adjacent cutouts 271-273 and 91-93 and the distances between the oblique portions of the cutouts 272 and 273 and the chamfered edges of the pixel electrode 190 are substantially the same.

A homeotropic alignment layer 21 is coated on the common electrode 270 and the protrusions 280*b*, and a pair of polarizers (not shown) are provided on outer surfaces of the panels 100 and 200 such that their polarization axes are crossed and one of the transmissive axes is parallel to the gate lines 121. One of the polarizers may be omitted when the LCD is a reflective LCD.

The LCD may further include at least one retardation film for compensating the retardation of the LC layer 3.

The LC molecules in the LC layer 3 are aligned such that their long axes are vertical to the surfaces of the panels 100 and 200. The liquid crystal layer 3 has negative dielectric anisotropy.

The cutouts 91-93 and 271-273 as well as the protrusions 280*a* and 280*b* controls the tilt directions of the LC molecules in the LC layer 3. That is, the liquid crystal molecules in each region called domain defined by adjacent cutouts 91-93 and 271-273 or by the cutout 272 or 273 and the chamfered edge of the pixel electrode 190 are tilted in a direction perpendicular to the extension direction of the cutouts 91-93 and 271-273. It is apparent that the domains have two long edges extending substantially parallel to each other and making an angle of about 45 degrees with the gate line 121.

The expansions of the drain electrodes 175 are disposed near corners of the domains to block the light leakage or the texture generated near the corners due to the disorder of the orientations of the LC molecules.

An LCD according to another embodiment of the present invention will be described in detail with reference to FIGS. 37 and 38.

Figure 37:
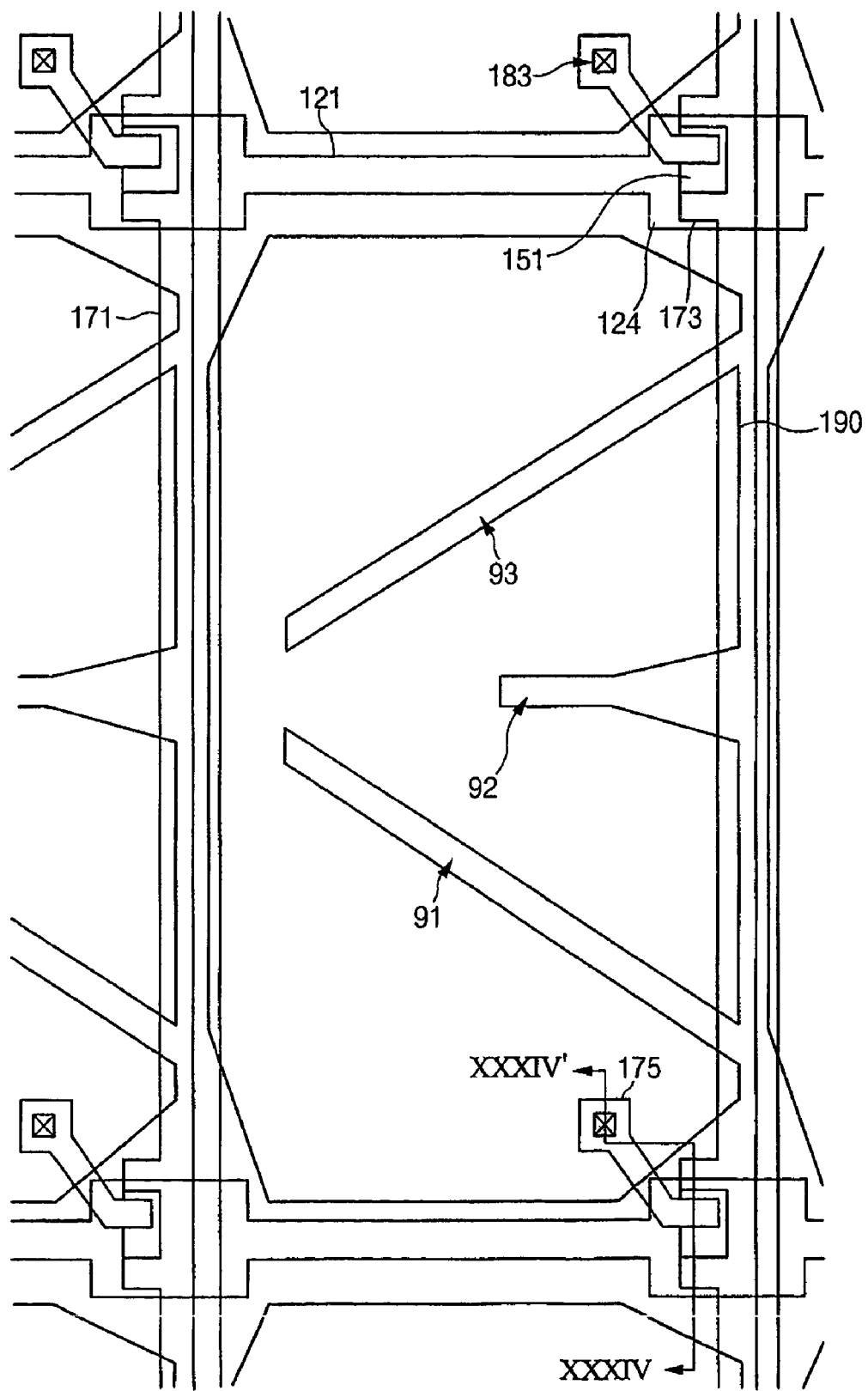
FIG. 37 is a layout view of an LCD according to another embodiment of the present invention.
Figure 38:
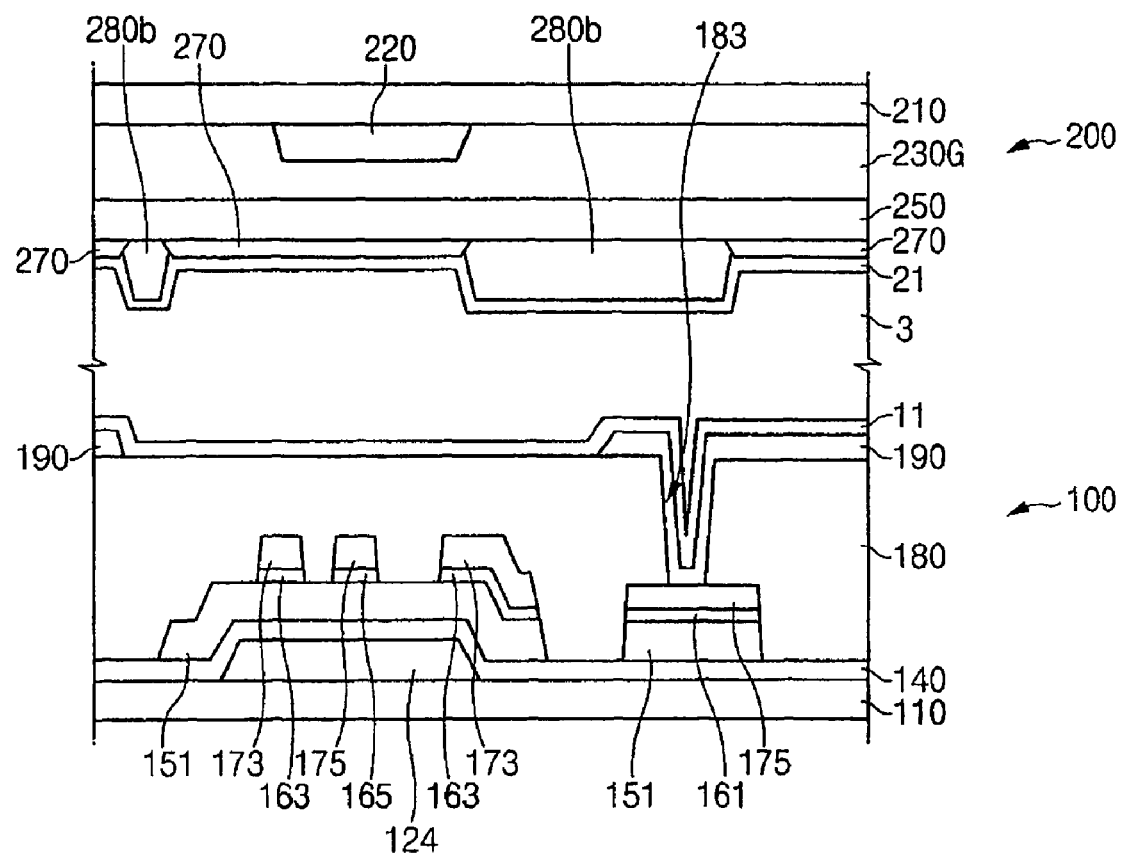
FIG. 38 is a sectional view of the LCD shown in FIG. 37 taken along the line XXXVII-XXXVII'.

FIG. 37 is a layout view of an LCD according to another embodiment of the present invention, and FIG. 38 is a sectional view of the LCD shown in FIG. 37 taken along the line XXXVII-XXXVII'.

Referring to FIGS. 37 and 38, an LCD according to this embodiment also includes a TFT array panel 100, a common electrode panel 200, and a LC layer 3 interposed therebetween.

Layered structures of the panels 100 and 200 according to this embodiment are almost the same as those shown in FIGS. 32-36.

Regarding the TFT array panel 100, a plurality of gate lines 121 including a plurality of gate electrodes 124 and a plurality of storage electrode lines 131 including a plurality of storage electrodes 133 are formed on a substrate 110, and a gate insulating layer 140, a plurality of semiconductor stripes 151 including a plurality of projections 154, and a plurality of ohmic contact stripes 161 including a plurality of projections 163 and a plurality of ohmic contact islands 165 are sequentially formed thereon. A plurality of data lines 171 including a plurality of source electrodes 173 and a plurality of drain electrodes 175 are formed on the ohmic contacts 161 and 165, and a passivation layer 180 is formed thereon. A plurality of contact holes 183 are provided at the passivation layer 180 and the gate insulating layer 140, and a plurality of protrusions 280a are formed on the passivation layer 180. A plurality of pixel electrodes 190 and a plurality of contact assistants 81 and 82 are formed on the passivation layer 180 and an alignment layer 11 is formed thereon.

Regarding the common electrode panel 200, a light blocking member 220, a plurality of color filters 230R, 230G and 230B, an overcoat 250, a common electrode 270, a plurality of protrusions 280b, and an alignment layer 21 are formed on an insulating substrate 210.

Different from the LCD shown in FIGS. 32-36, the semiconductor stripes 151 have almost the same planar shapes as the data lines 171 and the drain electrodes 175 as well as the underlying ohmic contacts 161 and 165. However, the projections 154 of the semiconductor stripes 151 include some exposed portions, which are not covered with the data lines 171 and the drain electrodes 175, such as portions located between the source electrodes 173 and the drain electrodes 175.

Many of the above-described features of the LCD shown in FIGS. 32-36 may be appropriate to the LCD shown in FIGS. 37 and 38.

An LCD according to another embodiment of the present invention will be described in detail with reference to FIG. 39.

Figure 39:
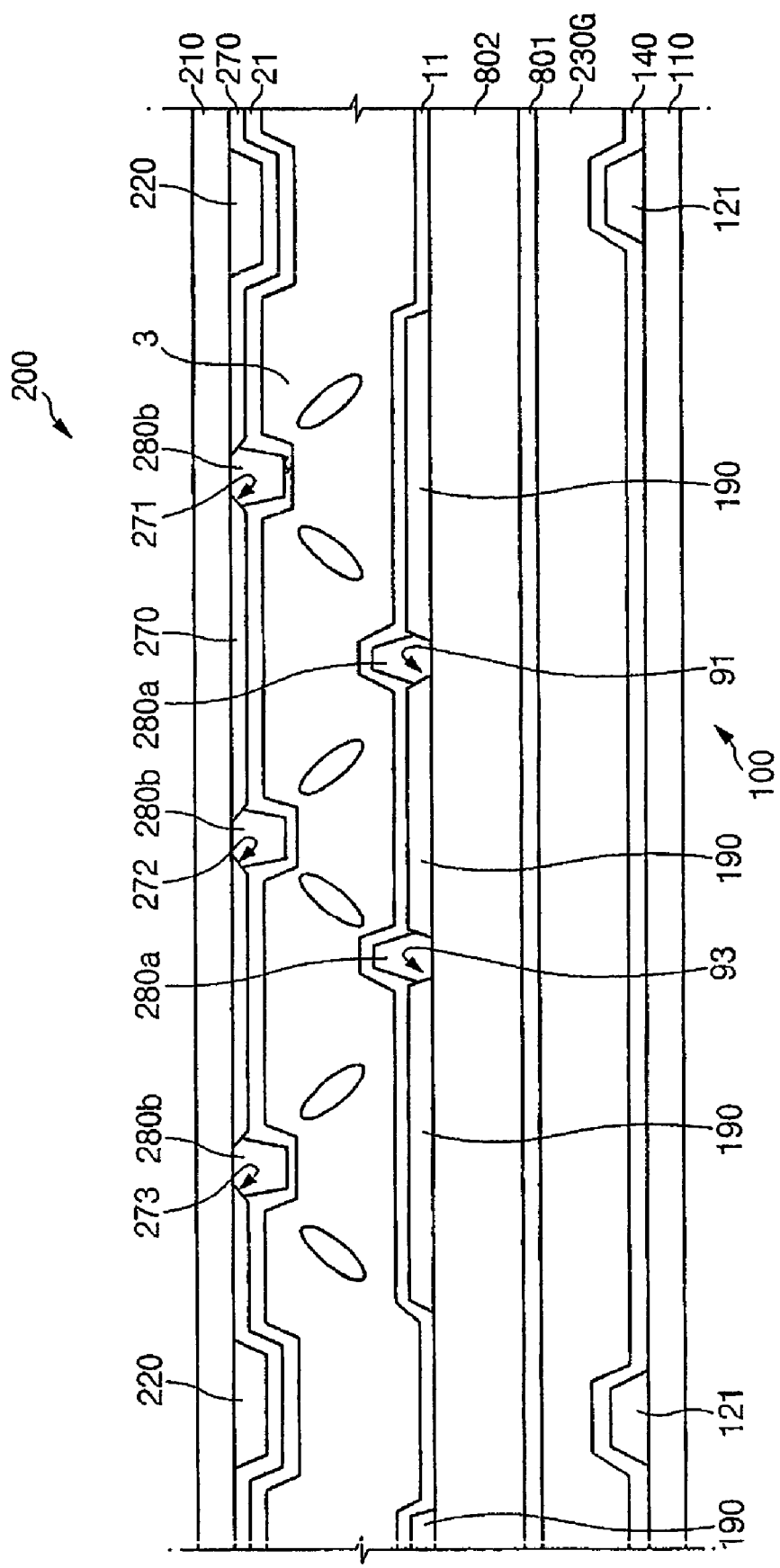
FIG. 39 is a sectional view of the LCD shown in FIG. 32 taken along the line XXXIII-XXXIII' according to an embodiment of the present invention.

FIG. 39 is a sectional view of the LCD shown in FIG. 32 taken along the line XXXIII-XXXIII' according to an embodiment of the present invention.

Referring to FIG. 39, an LCD according to this embodiment also includes a TFT array panel 100, a common electrode panel 200, and a LC layer 3 interposed therebetween.

Regarding a TFT array panel 100, a plurality of gate lines 121 including a plurality of gate electrodes 124 and a plurality of storage electrode lines 131 including a plurality of storage electrodes 133 are formed on a substrate 110, and a gate insulating layer 140, a plurality of semiconductor stripes 151 including a plurality of projections 154, and a plurality of ohmic contact stripes 161 including a plurality of projections 163 and a plurality of ohmic contact islands 165 are sequentially formed thereon. A plurality of data lines 171 including a plurality of source electrodes 173 and a plurality of drain electrodes 175 are formed on the ohmic contacts 161 and 165 and the gate insulating layer 140.

A first passivation layer 801 preferably made of inorganic insulator such as SiNx is formed on the data lines 171 and the drain electrodes 175.

A plurality of red, green and blue color filters 230R, 230G and 230B is formed on the first passivation layer 801.

A second passivation layer 802 preferably made of photosensitive organic material is formed on the color filters 230R, 230G and 230B. The second passivation layer 802 also forms hills when running over the hills formed by the color filters 230R, 230G and 230B and the hills of the second passivation layer 802 enhance the control of the tilt directions of LC molecules in the LC layer 3. The second passivation layer 802 prevents the color filters 230R, 230G and 230B from contaminating a the common electrode 270 to contaminate the LC layer 3 and it may be made of inorganic insulator such as SiNx and SiO$_2$.

A plurality of protrusions 280 are formed on the second passivation layer 802.

A plurality of pixel electrodes 190 are formed on the second passivation layer 802 and an alignment layer 11 is formed thereon.

The common electrode panel 200 includes a light blocking member 220, a common electrode 270, and an alignment layer 21 formed on an insulating substrate 210. Comparing the common electrode panel 200 shown in FIG. 8, the common electrode panel 200 shown in FIG. 39 has no color filter and no overcoat.

Since the color filters 230R, 230G and 230B and the pixel electrodes 190 are provided on the TFT array panel 100, the LCD shown in FIGS. 16-18 may have a large alignment margin for aligning the TFT array panel 100 and the common electrode panel 200.

As described above, the protrusions are disposed on the data lines to decrease parasitic capacitances generated by the data lines. Furthermore, since the protrusions and the cutouts are disposed on the same plane, the fringe field for tilting the LC molecules is enhanced and thus the width of the cutouts can be reduced to increase the aperture ratio.

The protrusions 280 may be formed along with a plurality of column spacers 320 to simplify the manufacturing process.

While the present invention has been described in detail with reference to the preferred embodiments, those skilled in the art will appreciate that various modifications and substitutions can be made thereto without departing from the spirit and scope of the present invention as set forth in the appended claims.

For example, the arrangements of the cutouts of the pixel electrodes and the common electrode may be modified and protrusions are provided instead of the cutouts.

What is claimed is:

1. A thin film transistor array panel, comprising:
  a substrate;
  a gate line formed on the substrate and including a gate electrode;
  a gate insulating layer formed on the gate line;
  a semiconductor layer formed on the gate insulating layer;
  a data line formed at least in part on the semiconductor layer;
  a drain electrode formed on the semiconductor layer at least in part and separated from the data line;
  a first passivation layer formed on the data line and the drain electrode;

a first protrusion formed directly on at least a portion of the first passivation layer and disposed on a portion corresponding to the data line;

a pixel electrode formed directly on the first passivation layer and connected to the drain electrode, the pixel electrode including a cutout, and a second protrusion disposed on the cutout.

2. The thin film transistor array panel of claim 1, further comprising a storage electrode line overlapping the pixel electrode.

3. The thin film transistor array panel of claim 2, wherein the storage electrode line comprises an expansion overlapping the drain electrode.

4. The thin film transistor array panel of claim 2, wherein the storage electrode line comprises a branch overlapping the cutout.

5. A thin film transistor array panel, comprising:

a substrate;

a gate line formed on the substrate and including a gate electrode;

a gate insulating layer formed on the gate line;

a semiconductor layer formed on the gate insulating layer;

a data line formed at least in part on the semiconductor layer;

a drain electrode formed on the semiconductor layer at least in part and separated from the data line;

a first passivation layer formed on the data line and the drain electrode and having a contact hole exposing the drain electrode at least in part;

a pixel electrode formed directly on the first passivation layer and connected to the drain electrode through the contact hole, the pixel electrode having a cutout; and a protrusion formed directly on at least a portion of the first passivation layer and disposed in the cutout at least in part.

6. The thin film transistor array panel of claim 5, further comprising a storage electrode line overlapping the pixel electrode.

7. The thin film transistor array panel of claim 6, wherein the storage electrode line comprises an expansion overlapping the drain electrode.

8. The thin film transistor array panel of claim 6, wherein the storage electrode line comprises a branch overlapping the cutout.

9. The thin film transistor array panel of claim 5, further comprising a spacer having a height larger than the protrusion and disposed on the same layer as the protrusion.

10. The thin film transistor array panel of claim 9, wherein the protrusion and the spacer comprise organic material.

11. The thin film transistor array panel of claim 5, comprising a color filter disposed between the first passivation layer, and the protrusion and the pixel electrode.

12. The thin film transistor array panel of claim 11, further comprising a second passivation layer formed on the color filter and intermediate to the protrusion and the pixel electrode.

13. The thin film transistor array panel of claim 5, wherein the semiconductor layer has substantially the same planar shape as the data line and the drain electrode.

* * * * *